United States Patent
Zhou et al.

(10) Patent No.: US 12,325,655 B2
(45) Date of Patent: Jun. 10, 2025

(54) DEVICE AND METHOD FOR BENDING VEHICLE GLASS

(71) Applicant: FUYAO GLASS INDUSTRY GROUP CO., LTD., Fujian (CN)

(72) Inventors: Zunguang Zhou, Fujian (CN); Zongfa Zheng, Fujian (CN); Daoding Chen, Fujian (CN); Tao Lin, Fujian (CN); Guangjin Zhuo, Fujian (CN); Zhenfang Li, Fujian (CN)

(73) Assignee: FUYAO GLASS INDUSTRY GROUP CO., LTD., Fujian (CN)

( * ) Notice: Subject to any disclaimer, the term of this patent is extended or adjusted under 35 U.S.C. 154(b) by 206 days.

(21) Appl. No.: 18/111,970

(22) Filed: Feb. 21, 2023

(65) Prior Publication Data

US 2023/0202902 A1 Jun. 29, 2023

Related U.S. Application Data

(63) Continuation of application No. PCT/CN2021/092105, filed on May 7, 2021.

(30) Foreign Application Priority Data

Aug. 21, 2020 (CN) .......................... 202010853530.6
Oct. 26, 2020 (CN) .......................... 202011159604.2

(51) Int. Cl.
C03B 23/035 (2006.01)
C03B 23/025 (2006.01)

(52) U.S. Cl.
CPC ...... C03B 23/0352 (2013.01); C03B 23/0258 (2013.01)

(58) Field of Classification Search
CPC ................................................ C03B 23/0352
See application file for complete search history.

(56) References Cited

U.S. PATENT DOCUMENTS 4,526,605 A * 7/1985 Frank ................. C03B 23/0357
65/273
5,318,615 A * 6/1994 Nagai ................. C03B 23/0307
65/273

(Continued)

FOREIGN PATENT DOCUMENTS

CN 1764607 A 4/2006
CN 102884014 A 1/2013

(Continued)

OTHER PUBLICATIONS

KR-101343631-B1 Machine Translation Clarivate Analytics retrieved Jan. 7, 2025. (Year: 2025).*

(Continued)

*Primary Examiner* — Lisa L Herring
(74) *Attorney, Agent, or Firm* — Scully, Scott, Murphy & Presser, P.C.

(57) ABSTRACT

A device and method for bending vehicle glass are provided in the disclosure. The device for bending vehicle glass includes a concave solid lower mold, at least one blowing pipe, and multiple extraction pipes. The concave solid lower mold includes a base and a top plate covered on the base. The base and the top plate cooperatively define an accommodating space. Multiple first partitions are arranged in the accommodating space to divide the accommodating space into multiple subspaces. The top plate has a carrying surface that is concave and away from the base. The top plate has multiple through holes that are in communication with the accommodating space and arranged at intervals. Each of the multiple subspaces corresponds to at least one of the multiple through holes.

9 Claims, 13 Drawing Sheets

(56) References Cited

U.S. PATENT DOCUMENTS

| | | | |
|---|---|---|---|
| 6,082,141 A | 7/2000 | Kuster | |
| 6,318,125 B1 | 11/2001 | Diederen et al. | |
| 6,668,589 B1* | 12/2003 | Mizusugi | C03B 23/0357 |
| | | | 65/273 |
| 9,096,456 B2 | 8/2015 | Thellier et al. | |
| 2007/0144211 A1* | 6/2007 | Hori | C03B 23/0305 |
| | | | 65/106 |
| 2017/0217820 A1* | 8/2017 | Balduin | C03B 23/0252 |

FOREIGN PATENT DOCUMENTS

| | | | |
|---|---|---|---|
| CN | 105793203 A | | 7/2016 |
| CN | 108137371 A | | 6/2018 |
| EP | 0613865 A1 | | 9/1994 |
| EP | 0839769 A1 | | 5/1998 |
| EP | 1798206 B1 | | 7/2009 |
| JP | 2002527349 A | | 8/2002 |
| KR | 1343631 B1 | * | 12/2013 |

OTHER PUBLICATIONS

Extended European Search Report dated Jan. 4, 2024 received in European Patent Application No. EP 21857230.3.
Notice of Reasons for Refusal dated Jan. 5, 2024 received in Japanese Patent Application No. JP 2023-501916.
CN First OA dated Mar. 12, 2021 issued in CN 202011159604.2.
CN Second OA dated Aug. 11, 2021 issued in CN 202011159604.2.
International Search Report dated Jul. 27, 2021 issued in PCT/CN2021/092105.

* cited by examiner

A device for bending vehicle glass is provided. The device includes a concave solid lower mold, multiple extraction pipes, and at least one blowing pipe. The concave solid lower mold includes a base and a top plate covered on the base. The base and the top plate cooperatively define an accommodating space. The top plate has a carrying surface that is away from the base and is an irregular concave shaping surface. The carrying surface is configured to carry at least one glass sheet. The top plate has multiple through holes. Multiple first partitions are arranged in the accommodating space to divide the accommodating space into multiple subspaces, each of the multiple subspaces communicates with at least one of the multiple through holes, each of the at least one blowing pipe communicates with at least one of the multiple subspaces, and the rest of the multiple subspaces communicates with the multiple extraction pipes in one-to-one correspondence.

A1

A2

The at least one glass sheet heated to a forming temperature is placed on the carrying surface, the at least one glass sheet is deformed under gravity.

A3

Gas is extracted from in the multiple the subspaces through the multiple extraction pipes and gas is blown into the at least one subspace through the at least one blowing pipe so that the at least one glass sheet can be completely attached to the carrying surface.

FIG. 16

DEVICE AND METHOD FOR BENDING VEHICLE GLASS

CROSS-REFERENCE TO RELATED APPLICATION(S)

This application is a continuation of International Application No. PCT/CN2021/092105, filed May 7, 2021, which claims priority to Chinese Patent Application No. 202010853530.6, filed Aug. 21, 2020, and Chinese Patent Application No. 202011159604.2, filed Oct. 26, 2020, the entire disclosures of which are hereby incorporated by reference.

TECHNICAL FIELD

The disclosure relates to the field of glass processing technology, in particular, to a device and method for bending vehicle glass.

BACKGROUND

With the development of society, vehicles are indispensable for people's travel. Vehicle production is increasing year by year, and the demand for vehicle glass is also increasing year by year. How to bend the glass and make it into a suitable shape is the key and difficult point in the glass processing.

When glass is processed by using a traditional device for bending vehicle glass, the glass is prone to generate an S-shaped glass spherical surface or a pan-shaped glass spherical surface due to the influence of a shape and gravity distribution of the glass, failing to meet glass forming requirements. Thus, a new device for bending vehicle glass is needed to adjust shapes of regions of the glass at various positions, so that the glass can meet corresponding structural requirements of bending.

SUMMARY

A device and method for bending vehicle glass are provided for glass bending processes in the disclosure, so that shapes of regions of glass at various positions are adjustable, and thus the glass can meet corresponding structural requirements of bending.

For realizing purposes of the disclosure, the following technical solutions are provided in the disclosure.

In a first aspect, a device for bending vehicle glass is provided. The device for bending vehicle glass includes a concave solid lower mold, at least one blowing pipe, and multiple extraction pipes. The concave solid lower mold includes a base and a top plate covered on the base. The base and the top plate cooperatively define an accommodating space. Multiple first partitions are arranged in the accommodating space to divide the accommodating space into multiple subspaces. The top plate has a carrying surface that is concave and away from the base. The top plate has multiple through holes that are in communication with the accommodating space and arranged at intervals. Each of the multiple subspaces corresponds to at least one of the multiple through holes. Each of the at least one blowing pipe communicates with at least one of the multiple subspaces and is configured for blowing gas to the at least one of the multiple subspaces. The multiple extraction pipes communicate with the rest of the multiple subspaces in one-to-one correspondence for extracting gas in the rest of the multiple subspaces.

In the device for bending vehicle glass provided in the disclosure, the accommodating space is divided into the multiple subspaces, and the at least one blowing pipe and the multiple extraction pipes communicate with the multiple subspaces in one-to-one correspondence to blow gas to or extract gas in the multiple subspaces, so that surface regions of the glass corresponding to the multiple subspaces may be subjected to different vacuum extracting gas effect or gas blowing effect. In this way, shapes of regions of the glass at various positions can be adjusted, so that the glass can meet corresponding structural requirements of bending.

In an embodiment, the multiple subspaces include a central subspace, a buffer subspace, and multiple edge subspaces. The central subspace corresponds to a middle region of the top plate, the buffer subspace surrounds the central subspace, and the multiple edge subspaces are distributed around the buffer subspace and cooperatively surround the buffer subspace, and the at least one blowing pipe communicates with the buffer subspace, and the multiple extraction pipes communicate with the central subspace and the multiple edge subspaces. The multiple subspaces in the device for bending vehicle glass are divided into the central subspace, the buffer subspace, and the multiple edge subspaces. The central subspace, the buffer subspace, and the multiple edge subspaces respectively correspond to different regions of the glass, the multiple extraction pipes are configured for extracting gas in the central subspace and the multiple edge subspace, and the at least one blowing pipe is configured for blowing gas to the buffer subspace, so that a vacuum extracting gas effect of or gas blowing effect for each of the multiple subspaces is adjustable, and thus vacuum adsorption force or gravity effect on the glass at various positions can be changed. In this way, a shape of the glass can be adjusted, so that the glass can meet corresponding structural requirements of bending.

In an embodiment, the multiple subspaces include a central subspace, a buffer subspace, and multiple edge subspaces. The central subspace corresponds to a middle region of the top plate, the buffer subspace surrounds the central subspace, and the multiple edge subspaces are distributed around the buffer subspace and cooperatively surround the buffer subspace, and the at least one blowing pipe communicates with the central subspace, and the multiple extraction pipes communicate with the buffer subspace and the multiple edge subspaces. With the above structure, it is possible to adjust a vacuum extracting gas effect of or gas blowing effect for each of the multiple subspaces, so that vacuum adsorption force or gravity effect on the glass at various positions can be changed. In this way, a shape of the glass can be adjusted, so that the glass can meet corresponding structural requirements of bending. The gas blowing effect can prevent a further falling of a spherical surface of the glass at a position corresponding to a subspace communicating with the blowing pipe. As a falling of the spherical surface of the glass at a position corresponding to the central subspace is prevented by the gas blowing effect, the force distribution of the glass at positions corresponding to the other subspaces (which include the buffer subspace and the multiple edge subspaces) is changed, making it easier to change the shape of the glass under the vacuum adsorption force generated by the multiple extraction pipes, even under a relatively low vacuum adsorption force. The relatively low vacuum adsorption force can further avoid possible excessive extrusion between the carrying surface and the glass at positions corresponding to the other subspaces (which include the buffer subspace and the multiple edge subspaces), improving the molding surface quality and the optical quality of the glass.

In an embodiment, the multiple edge subspaces include a lower subspace, an upper subspace, a first side subspace, and a second side subspace. The lower subspace and the upper subspace are located at opposite sides of the buffer subspace, the first side subspace and the second side subspace are located at opposite sides of the buffer subspace, and the top plate has a first region corresponding to the lower subspace and a second region corresponding to the upper subspace, where a radius of curvature of the first region is greater than a radius of curvature of the second region. The multiple edge subspaces are divided into the lower subspace, the upper subspace, the first side subspace, and the second side subspace. The lower subspace, the upper subspace, the first side subspace, and the second side subspace correspond to different regions of the edge of the glass. Gas extracting is performed for the lower subspace, the upper subspace, the first side subspace, and the second side subspace separately, so that different regions of the edge of the glass are subjected to corresponding vacuum adsorption force, and the shape of the edge of the glass can be adjusted more precisely.

In an embodiment, the device further includes a control member. The control member is configured to adjust the multiple extraction pipes and the at least one blowing pipe so that a vacuum extracting gas effect of or gas blowing effect for each of the multiple subspaces is adjustable. The control member enables the extraction performance of the extraction pipe and the blowing performance of the blowing pipe to be effectively regulated, so that the vacuum extracting gas effect of or gas blowing effect for each of the multiple subspaces can be precisely adjusted, and thus the shape of the glass is changed under a corresponding vacuum adsorption force at the position corresponding to each of the multiple subspaces to meet corresponding structural requirements of bending.

In an embodiment, the device further includes a first gas-heating system. The first gas-heating system is mounted at the at least one blowing pipe and configured to heat gas blown from the at least one blowing pipe to the glass so that a temperature of the gas is adjustable. The first gas-heating system is configured to effectively regulate a temperature of gas blown from the blowing pipe, and in turn adjust a temperature of gas blown into in the subspace communicating with the blowing pipe, so that the temperature of the glass at a position corresponding to the subspace communicating with the blowing pipe can be more precisely controlled, controlling and preventing the spherical surface of the glass from further falling at the position corresponding to the subspace communicating with the blowing pipe, and satisfying the corresponding structural requirements of bending.

In an embodiment, the device further includes an annular upper mold. The annular upper mold is disposed at a side of the top plate away from the base and includes an upper mold plate and a side mold plate that is disposed at a side of the upper mold plate facing the carrying surface. The upper mold plate, the side mold plate, and an upper surface of the glass cooperatively define an accommodating cavity when the annular upper mold and the concave solid lower mold move towards each other to make the side mold plate in contact with the upper surface of the glass, where the accommodating cavity has a blowing channel, and the blowing channel faces the carrying surface and is configured for blowing gas to the glass. The blowing channel of the annular upper mold is configured for blowing gas to the upper surface of the glass, so that the upper surface of the glass is subjected to a blowing press force while the lower surface of the glass is subjected to a vacuum adsorption force, realizing a rapid bending of the glass. Moreover, when the device for bending vehicle glass includes both the concave solid lower mold and the annular upper mold, multiple glasses stacked may be processed at the same time, which improves the processing efficiency to a certain extent.

In an embodiment, multiple second partitions are arranged in the accommodating cavity and divide the accommodating cavity into multiple accommodating sub-cavities. The multiple accommodating sub-cavities include a central accommodating sub-cavity and multiple edge accommodating sub-cavities, the central accommodating sub-cavity corresponds to the central subspace and the buffer subspace, the multiple edge accommodating sub-cavities correspond to the first side subspace, the second side subspace, the lower subspace, and the upper subspace in one-to-one correspondence, and the accommodating cavity has multiple blowing channels, where at least one of the multiple blowing channels is disposed in each of the multiple accommodating sub-cavities. The multiple accommodating sub-cavities are divided into the central accommodating sub-cavity corresponding to a central region of the glass and the multiple edge accommodating sub-cavities corresponding to edge regions of the glass. The multiple blowing channels are defined in the central accommodating sub-cavity and the multiple edge accommodating sub-cavities to blow gas to regions of the glass at corresponding positions, so that a blowing press force can be applied to a surface of the glass, and a shape of the glass can be adjusted to meet corresponding structural requirements of bending. Moreover, the multiple accommodating sub-cavities correspond to the multiple subspaces, so that each region of the glass can be subjected to a corresponding vacuum adsorption force and blowing press force, facilitating double adjustments of a forming shape of the glass.

In an embodiment, the central accommodating sub-cavity includes a first central accommodating sub-cavity and a second central accommodating sub-cavity. The first central accommodating sub-cavity corresponds to the central subspace, and the second central accommodating sub-cavity corresponds to the buffer subspace, and at least one of the multiple blowing channels is disposed in each of the first central accommodating sub-cavity and the second central accommodating sub-cavity. The central accommodating sub-cavity is divided into the first central accommodating sub-cavity and the second central accommodating sub-cavity. The first central accommodating sub-cavity corresponds to the central subspace and the second central accommodating sub-cavity corresponds to the buffer subspace, so that a shape of the central region of the glass can be adjusted more precisely.

In an embodiment, the blowing channel has a blowing power, a blowing starting time, and a blowing duration that are all adjustable. By adjusting the blowing power, the blowing starting time, and the blowing duration of each blowing channel, a blowing press force generated by each accommodating sub-cavity through the blowing channel can be effectively regulated to adjust a shape of the glass at a position corresponding to each accommodating sub-cavity, so that the glass can meet corresponding structural requirements of bending.

In an embodiment, the device further includes a second gas-heating system. The second gas-heating system is mounted at the blowing channel to heat gas blown from the blowing channel to the glass so that a temperature of the gas is adjustable. The second gas-heating system is configured to effectively regulate a temperature of gas blown from the blowing channel so that a bending temperature of the glass can be more precisely controlled, or to compensate heat loss in the above-mentioned gas-blowing process and gas-extracting process. At the same time, the bending temperature of the glass can be more precisely controlled, and the glass forming quality and the stress controllability after annealing can be further improved.

In an embodiment, the device further includes a preformed frame in an annular shape. The preformed frame is sheathed on a periphery of the concave solid lower mold, and has a radius of curvature larger than a radius of curvature of the concave solid lower mold. The preformed frame is used for preforming the glass. The glass heated to a forming temperature is placed on the preformed frame, and the glass is preformed by gravity. Then, the preformed frame is sheathed on the periphery of the concave solid lower mold from the top down, and the glass is placed on the concave solid lower mold for secondary molding.

In an embodiment, there is one glass sheet or multiple glass sheets stacked on the carrying surface. When the multiple glass sheets are stacked on the carrying surface of the concave solid lower mold, the device for bending vehicle glass may process the multiple glass sheets at the same time to improve the processing efficiency.

In a second aspect, a method for bending vehicle glass is provided.

A device for bending vehicle glass is provided. The device includes a concave solid lower mold, multiple extraction pipes, and at least one blowing pipe. The concave solid lower mold includes a base and a top plate covered on the base. The base and the top plate cooperatively define an accommodating space. The top plate has a carrying surface that is away from the base and is an irregular concave shaping surface. The carrying surface is configured to carry at least one glass sheet. The top plate has multiple through holes. Multiple first partitions are arranged in the accommodating space to divide the accommodating space into multiple subspaces, each of the multiple subspaces communicates with at least one of the multiple through holes, each of the at least one blowing pipe communicates with at least one of the multiple subspaces, and the rest of the multiple subspaces communicates with the multiple extraction pipes in one-to-one correspondence.

The at least one glass sheet heated to a forming temperature is placed on the carrying surface, the at least one glass sheet is deformed under gravity.

Gas is extracted from in the multiple the subspaces through the multiple extraction pipes and gas is blown into the at least one subspace through the at least one blowing pipe so that the at least one glass sheet can be completely attached to the carrying surface.

The at least one glass sheet is processed by the method for bending vehicle glass provided in the disclosure, which is beneficial to effectively adjust the shapes of regions of the at least one glass sheet at various positions, so that the at least one glass sheet meets the corresponding structural requirements of bending.

In an embodiment, the multiple subspaces include a central subspace, a buffer subspace, and multiple edge subspaces. The central subspace corresponds to a middle region of the top plate, the buffer subspace surrounds the central subspace, and the multiple edge subspaces are distributed around the buffer subspace and cooperatively surround the buffer subspace. The at least one blowing pipe communicates with the buffer subspace, and the multiple extraction pipes communicate with the central subspace and the multiple edge subspaces, and the multiple extraction pipes have different extraction modes.

In an embodiment, the multiple subspaces include a central subspace, a buffer subspace, and multiple edge subspaces. The central subspace corresponds to a middle region of the top plate, the buffer subspace surrounds the central subspace, and the multiple edge subspaces are distributed around the buffer subspace and cooperatively surround the buffer subspace. The at least one blowing pipe communicates with the central subspace, and the multiple extraction pipes communicate with the buffer subspace and the plurality of edge subspaces, and the multiple extraction pipes have different extraction modes.

In an embodiment, the multiple edge subspaces include a lower subspace, an upper subspace, a first side subspace, and a second side subspace. The lower subspace and the upper subspace are located at opposite sides of the buffer subspace, and the first side subspace and the second side subspace are located at opposite sides of the buffer subspace. Extraction pipes communicating with the lower subspace and the upper subspace communicating extract gas in a first mode, extraction pipes communicating with the first side subspace and the second side subspace extract gas in a second mode, where the first mode is different from the second mode.

By extracting gas in or blowing gas to the multiple subspaces in different modes, regions of the glass corresponding to different subspaces are subjected to different vacuum adsorption forces, thereby adjusting a deformation of each region of the glass, so that the glass meets the corresponding structural requirements of bending.

In an embodiment, the gas in the multiple subspaces is extracted through the multiple extraction pipes and the gas is blown into the at least one subspace through the at least one blowing pipe as follows, so that the vehicle glass can be completely attached to the carrying surface.

An extraction power, an extraction starting time, and an extraction duration of each of the multiple extraction pipes are adjusted to adjust a vacuum extracting gas effect in each of the multiple subspaces respectively.

A blowing temperature, a blowing power, a blowing starting time, and a blowing duration of the at least one blowing pipe are adjusted.

By regulating the extraction performance of each of the multiple extraction pipes and the blowing performance of the at least one blowing pipe, the vacuum extracting gas effect of or gas blowing effect for each of the multiple subspaces can be precisely adjusted, and thus the shape of the glass is changed under a corresponding vacuum adsorption force at the position corresponding to each of the multiple subspaces to meet the corresponding structural requirements of bending.

In an embodiment, the extraction power, the extraction starting time, and the extraction duration of each of the multiple extraction pipes are adjusted to adjust the vacuum extracting gas effect in each of the multiple subspaces respectively as follows.

An extraction power of an extraction pipe communicating with the central subspace or the buffer subspace is adjusted to be a first extraction power, an extraction power of an extraction pipe communicating with the lower subspace and the upper subspace is adjusted to be a second extraction power, and an extraction power of an extraction pipe communicating with the first side subspace and the second side subspace is adjusted to be a third extraction power, where the second extraction power is less than the first extraction power, and the third extraction power is less than the second extraction power. By adjusting the extraction power of the extraction pipe, a vacuum adsorption force exerted on the glass at a position corresponding to each subspace can be adjusted, so that the shape of the glass can be changed to meet the corresponding structural requirements of bending.

In an embodiment, the extraction power, the extraction starting time, and the extraction duration of each of the multiple extraction pipes are adjusted to adjust the vacuum extracting gas effect in each of the multiple subspaces respectively as follows.

An extraction starting time of an extraction pipe communicating with the central subspace or the buffer subspace is adjusted to be a first time, an extraction starting time of an extraction pipe communicating with the lower subspace and the upper subspace is adjusted to be a second time, and an extraction starting time of an extraction pipe communicating with the first side subspace and the second side subspace is adjusted to be a third time, where the second time is later than the first time and the third time is later than the second time. By adjusting the extraction starting time of the extraction pipe, a sequence of applying vacuum adsorption forces to regions of the glass corresponding to the multiple subspaces can be adjusted, so that the shape of the glass can be changed to meet the corresponding structural requirements of bending.

In an embodiment, the extraction power, the extraction starting time, and the extraction duration of each of the multiple extraction pipes are adjusted to adjust the vacuum extracting gas effect in each of the multiple subspaces respectively as follows.

An extraction duration of an extraction pipe communicating with the central subspace or the buffer subspace is adjusted to be a first duration, an extraction duration of an extraction pipe communicating with the lower subspace and the upper subspace is adjusted to be a second duration, and an extraction duration of an extraction pipe communicating with the first side subspace and the second side subspace is adjusted to be a third duration, where the second duration is shorter than the first duration and the third duration is later than the second duration. By adjusting the extraction duration of the extraction pipe, a duration of exertion of a vacuum adsorption force on the glass at a position corresponding to each of the multiple subspaces can be adjusted, so that the shape of the glass can be changed to meet the corresponding structural requirements of bending.

In an embodiment, the extraction power, the extraction starting time, and the extraction duration of each of the multiple extraction pipes are adjusted to adjust the vacuum extracting gas effect in each of the multiple subspaces respectively as follows.

An extraction power of an extraction pipe communicating with the lower subspace and the upper subspace is adjusted to be less than an extraction power of an extraction pipe communicating with the central subspace or the buffer subspace, and an extraction power of an extraction pipe communicating with the first side subspace and the second side subspace is adjusted to be less than the extraction power of the extraction pipe communicating with the lower subspace and the upper subspace.

An extraction starting time of the extraction pipe communicating with the lower subspace and the upper subspace is adjusted to be later than an extraction starting time of the extraction pipe communicating with the central subspace or the buffer subspace, and an extraction starting time of the extraction pipe communicating with the first side subspace and the second side subspace is adjusted to be later than the extraction starting time of the extraction pipe communicating with the lower subspace and the upper subspace.

An extraction duration of the extraction pipe communicating with the lower subspace and the upper subspace is adjusted to be shorter than an extraction duration of the extraction pipe communicating with the central subspace or the buffer subspace, and an extraction duration of the extraction pipe communicating with the first side subspace and the second side subspace is adjusted to be shorter than the extraction duration of the extraction pipe communicating with the lower subspace and the upper subspace.

The extraction power, the extraction starting time, and the extraction duration of the extraction pipe are adjusted at the same time, thereby more systematically adjusting a shape of each region of the glass, so that the glass can meet the corresponding structural requirements of bend molding.

In an embodiment, the extraction power, the extraction starting time, and the extraction duration of each of the multiple extraction pipes are adjusted to adjust the vacuum extracting gas effect in each of the multiple subspaces respectively as follows.

An extraction pipe communicating with at least one of the central subspace, the buffer subspace, the lower subspace, the upper subspace, the first side subspace, or the second side subspace is closed, when the at least one glass sheet is attached to or proximately attached to the carrying surface at a position corresponding to the at least one of the central subspace, the buffer subspace, the lower subspace, the upper subspace, the first side subspace, or the second side subspace. When the surface of the glass is attached to or proximately attached to the carrying surface at a position corresponding to one subspace, an extraction pipe communicating with the one subspace may be closed, and the shape of the glass may be indirectly adjusted by extracting gas through extraction pipes communicating with subspaces adjacent to the one subspace, avoiding excessive extrusion between the glass and the carrying surface caused by continuous extracting gas.

In an embodiment, the blowing temperature, the blowing power, the blowing starting time, and the blowing duration of the at least one blowing pipe are adjusted as follows.

The at least one blowing pipe starts blowing when the at least one glass sheet is attached to or proximately attached to the carrying surface at a position corresponding to at least one of the central subspace, the lower subspace, the upper subspace, the buffer subspace, the first side subspace, or the second side subspace, where the blowing power of the at least one blowing pipe is less than or equal to the extraction power of each of the multiple extraction pipes, and/or the blowing duration of the at least one blowing pipe is less than or equal to the extraction duration of each of the multiple extraction pipes. When the surface of the glass is attached to or proximately attached to the carrying surface at a position corresponding to at least one subspace, in order to avoid optical defects caused by extrusion between the surface of the glass and the carrying surface (where the extrusion is caused by gas extracting through the extraction pipe), gas blowing effect through the blowing pipe can be performed to lower the vacuum extracting gas effect and in turn prevent excessive extrusion between the surface of the glass and the carrying surface. Further, the gas blowing effect can prevent a further falling of the spherical surface of the glass at a position corresponding to a subspace communicating with the blowing pipe. As a falling of the spherical surface of the glass at a position corresponding to the central subspace is prevented by the gas blowing effect, the force distribution of the glass at positions corresponding to the other subspaces (which include the buffer subspace and the multiple edge subspaces) is changed, making it easier to change the shape of the glass under the vacuum adsorption force generated by the extraction pipe, even under a relatively low vacuum adsorption force. The relatively low vacuum adsorption force can further avoid possible excessive extrusion between the carrying surface and the glass at positions corresponding to the other subspaces (which include the buffer subspace and the multiple edge subspaces), improving the molding surface quality and the optical quality of the glass.

In an embodiment, the blowing temperature, the blowing power, the blowing starting time, and the blowing duration of the at least one blowing pipe are adjusted as follows.

When a curvature of the spherical surface of the glass at a position corresponding to the subspace communicating with the blowing pipe is proximate to or equal to a desired curvature, gas blowing effect can prevent the spherical surface of the glass from further falling at the position corresponding to the subspace communicating with the blowing pipe. By regulating a blowing gas temperature of a gas-heating system communicating with the blowing pipe on the concave solid lower mold, a temperature of the surface of the glass at a position corresponding to the subspace communicating with the blowing pipe can be precisely controlled. When the blowing gas temperature of the gas-heating system is set to be lower than or equal to the temperature of the surface of the glass, gas blowing effect may lower the temperature of the glass at the position corresponding to the subspace communicating with the blowing pipe, thereby further preventing the spherical surface of the glass from further falling at the position corresponding to the subspace communicating with the blowing pipe. This means that the closer the curvature of the spherical surface of the glass at the position corresponding to the subspace communicating with the blowing pipe is to the desired curvature, the lower the blowing gas temperature of the gas-heating system is relative to the temperature of the surface of the glass. As such, the temperature of the glass at the position corresponding to the subspace communicating with the blowing pipe can be lowered, better preventing the spherical surface of the glass from further falling at the position corresponding to the subspace communicating with the blowing pipe.

In an embodiment, the device further includes an annular upper mold. The annular upper mold is disposed at a side of the top plate away from the base and includes an upper mold plate and a side mold plate that is disposed at a side of the upper mold plate facing the carrying surface. The upper mold plate, the side mold plate, and an upper surface of the vehicle glass cooperatively define an accommodating cavity when the annular upper mold and the concave solid lower mold move towards each other to make the side mold plate in contact with the upper surface of the at least one glass sheet, where the accommodating cavity has a blowing channel, and the blowing channel faces the carrying surface and is configured for blowing gas to the at least one glass sheet. Gas is blown to the upper surface of the glass through the blowing channel of the annular upper mold, so that the upper surface of the glass is subjected to a blowing press force while the lower surface of the glass is subjected to a vacuum adsorption force, realizing a rapid bending of the glass. Moreover, when the device includes both the concave solid lower mold and the annular upper mold, multiple glasses stacked may be processed at the same time, which improves the processing efficiency to a certain extent.

In an embodiment, multiple second partitions are arranged in the accommodating cavity and divide the accommodating cavity into multiple accommodating sub-cavities, where the multiple accommodating sub-cavities correspond to the multiple subspaces respectively. The accommodating cavity has multiple blowing channels, where at least one of the multiple blowing channels is disposed in each of the multiple accommodating sub-cavities. The method includes the following. A blowing power, a blowing starting time, and a blowing duration of each of the plurality of blowing channels are adjusted, so that the at least one glass sheet is subjected to different blowing pressures at different positions opposite the plurality of accommodating sub-cavities. The multiple accommodating sub-cavities correspond to the multiple subspaces, so that each region of the glass can be subjected to a corresponding vacuum adsorption force and blowing press force, facilitating double adjustments of a forming shape of the glass.

BRIEF DESCRIPTION OF THE DRAWINGS

To describe the technical solutions in embodiments of the disclosure or the related art more clearly, the following briefly introduces the accompanying drawings required for describing the embodiments or the related art. Apparently, the accompanying drawings in the following description illustrate some embodiments of the disclosure. Those of ordinary skill in the art may also obtain other drawings based on these accompanying drawings without creative efforts.

FIG. 16 is a schematic flow chart of a method for bending vehicle glass according to an embodiment.

DETAILED DESCRIPTION

The technical solutions in the embodiments of the disclosure are clearly and completely described in the following with reference to the accompanying drawings in the embodiments of the disclosure. Apparently, the described embodiments are merely a part of rather than all the embodiments of the disclosure. All other embodiments obtained by those of ordinary skill in the art based on the embodiments of the disclosure without creative efforts are within the scope of the disclosure.

Figure 1:
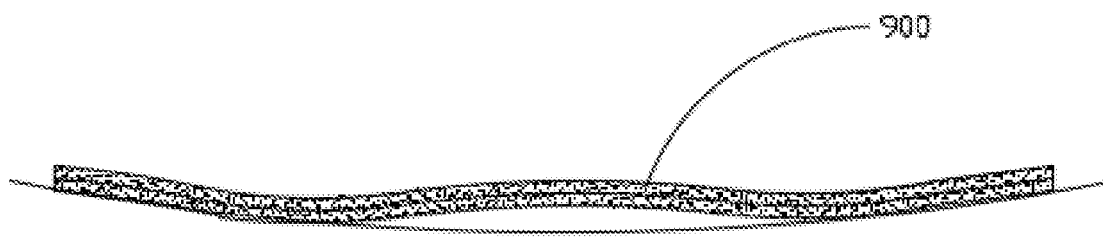
FIG. 1 is a schematic diagram of glass preformed.
Figure 2:
FIG. 2 is a schematic structural view of glass that meets corresponding bending requirements.

Refer to FIG. 1 and FIG. 2, FIG. 1 is a schematic diagram of glass sheets 900 preformed.

FIG. 2 is a schematic structural view of the glass sheets 900 that meets corresponding bending requirements.

As illustrated in FIG. 1, the glass sheets 900 heated to a forming temperature is subjected to a gravity preforming process. However, as the glass sheets 900 has different shapes and gravity distributions at different positions thereof, the glass sheets 900 preformed is prone to generate an S-shaped glass spherical surface or a pan-shaped glass spherical surface, failing to meet forming requirements of the glass sheets 900.

Therefore, a device for bending vehicle glass is provided in the embodiments of the disclosure and is configured for performing a secondary bending process for the glass sheets 900, so that shapes of different positions of the glass sheets 900 are consistent with corresponding desired shapes (as illustrated in FIG. 2), that is, a falling depth of a surface of the glass sheets 900 is the same as a desired curvature difference, so that corresponding bending structural requirements can be satisfied.

Figure 3:
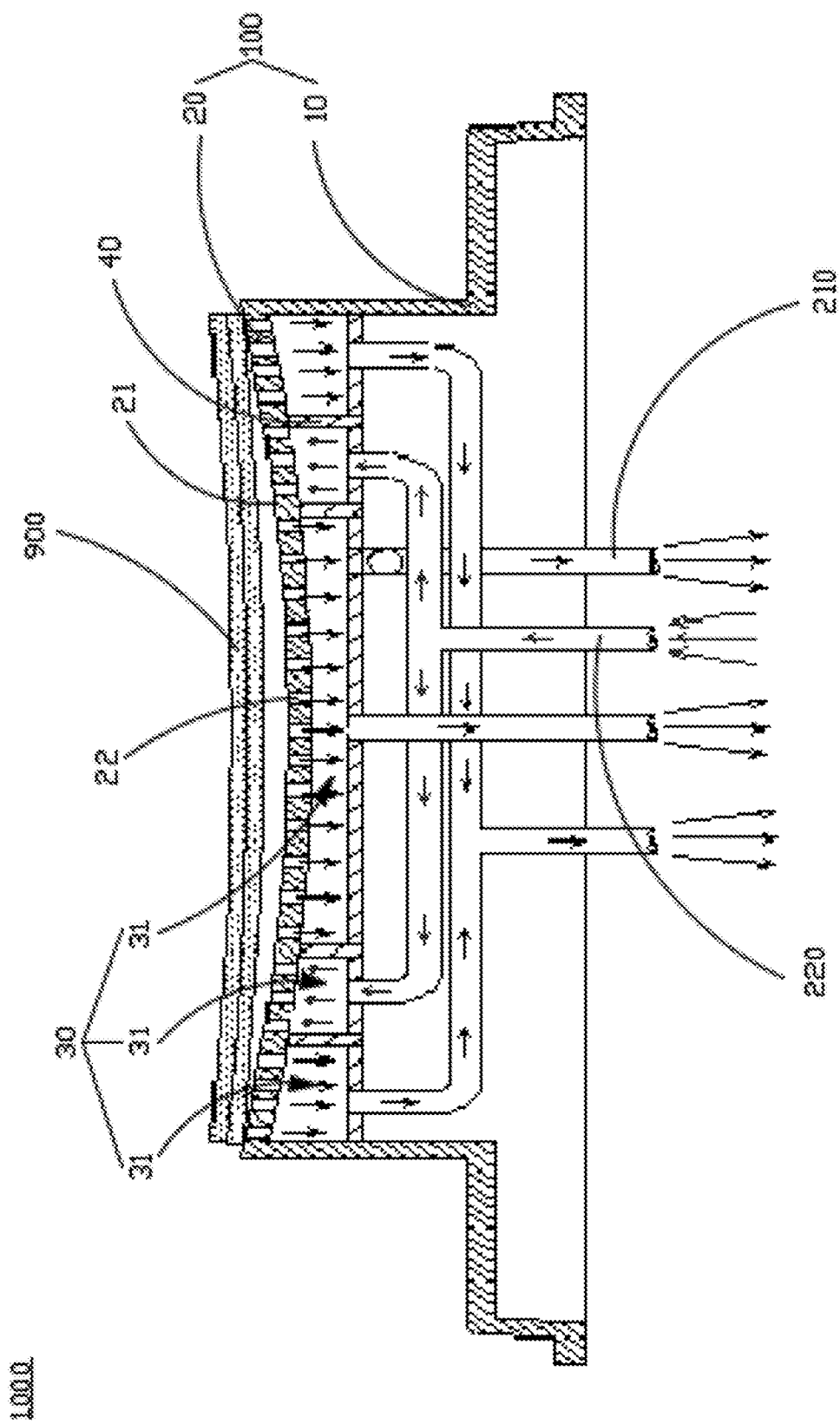
FIG. 3 is a schematic structural view of a device for bending vehicle glass according to an embodiment.
Figure 4:
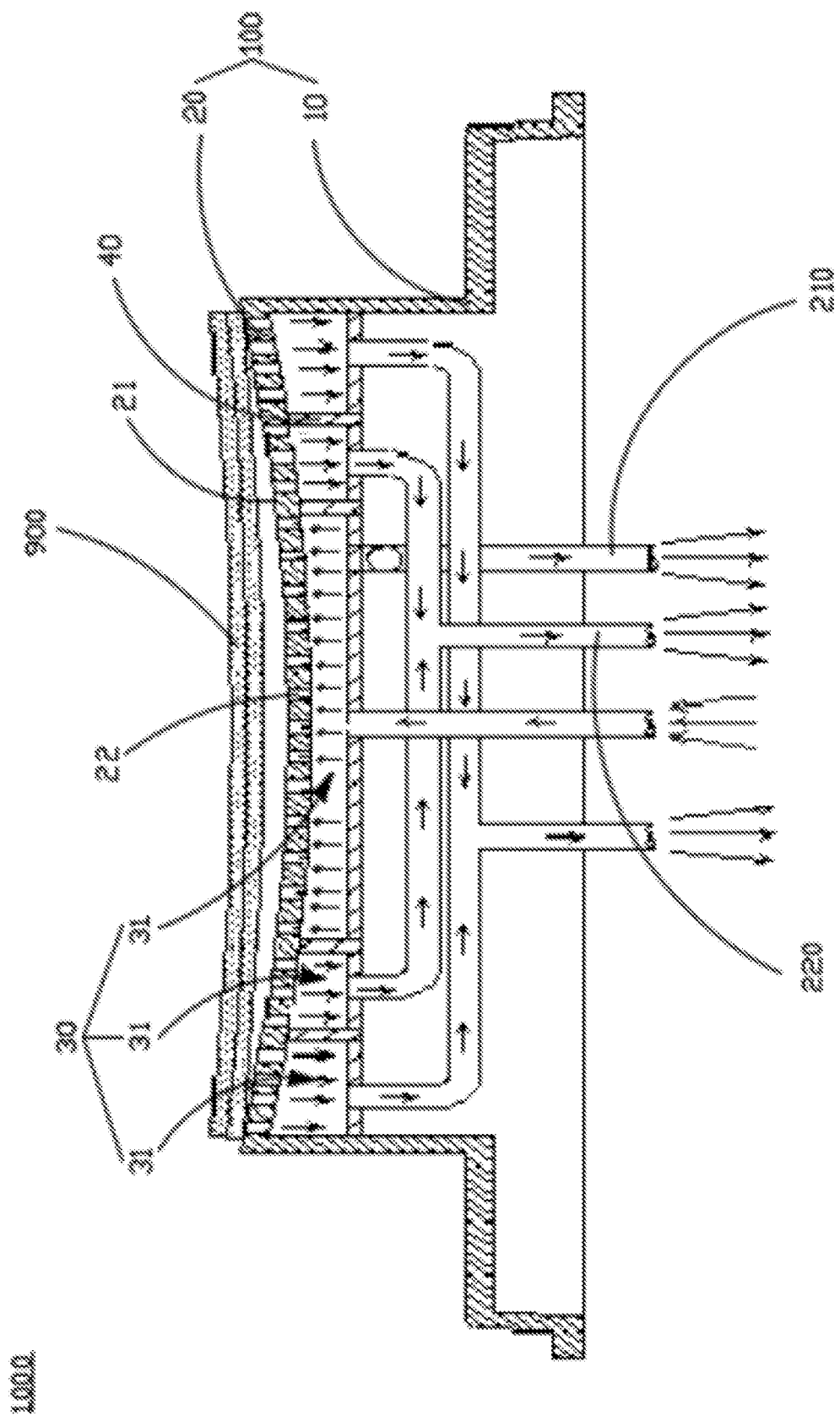
FIG. 4 is a schematic structural view of a device for bending vehicle glass according to another embodiment.

Refer to FIG. 3 and FIG. 4, FIG. 3 is a schematic structural view of a device 1000 for bending vehicle glass according to an embodiment.

FIG. 4 is a schematic structural view of the device 1000 for bending vehicle glass according to another embodiment.

In the embodiments of the disclosure, the device 1000 for bending vehicle glass is provided. The device 1000 for bending vehicle glass includes a concave solid lower mold 100, at least one blowing pipe 220, and multiple extraction pipes 210. The concave solid lower mold 100 includes a base 10 and a top plate 20 covered on the base 10. The base 10 and the top plate 20 cooperatively define an accommodating space 30. Multiple first partitions 40 are arranged in the accommodating space 30 to divide the accommodating space 30 into multiple subspaces 31. The top plate 20 has a carrying surface 21 that is concave and away from the base 10. The top plate 20 has multiple through holes 22 that are in communication with the accommodating space 30 and arranged at intervals. Each of the multiple subspaces 31 corresponds to at least one of the multiple through holes 22. Each of the at least one blowing pipe 220 communicates with at least one of the multiple subspaces 31 and is configured for blowing gas to the at least one of the multiple subspaces 31. The multiple extraction pipes 210 communicate with the rest of the multiple subspaces 31 in one-to-one correspondence for extracting gas in the rest of the multiple subspaces 31. The carrying surface 21 is configured to carry the glass sheets 900, and a shape of the carrying surface 21 is the same as a desired shape. That is, when the surface of the glass sheets 900 can be completely attached to the carrying surface 21, a shape of the glass sheets 900 is consistent with the desired shape, so that the glass sheets 900 can meet the corresponding requirements of bending.

In an embodiment, the top plate 20 has the multiple through holes 22 that are in communication with the accommodating space 30 and arranged at intervals, and each of the multiple subspaces 31 corresponds to at least one of the multiple through holes 22. As such, when gas is extracted from or blown into each subspace 31, a vacuum generated in each subspace 31 will directly exert on the surface of the glass sheets 900, so that the shape of the glass sheets 900 will change under the influence of a vacuum adsorption force. It is noted that, the subspaces 31 are distributed at different positions and correspond to regions of the glass sheets 900 at different positions, respectively, and thus shapes of regions of the glass sheets 900 at various positions can be adjusted, so that the shapes of the regions of the glass sheets 900 at various positions can be consistent with corresponding desired shapes, and accordingly the corresponding structural requirements of bend molding can be satisfied.

In an embodiment, there is one glass sheets 900 or multiple glass sheets 900 stacked on the carrying surface 21. When the multiple glass sheets 900 are stacked on the carrying surface 21 of the concave solid lower mold 100, the device 1000 for bending vehicle glass may process the multiple glass sheets 900 at the same time to improve the processing efficiency.

In the device 1000 for bending vehicle glass provided in the disclosure, the accommodating space 30 is divided into the multiple subspaces 31, where at least one subspace 31 communicates with at least one blowing pipe 220 to blow gas into the at least one subspace 31, and the rest of the multiple subspaces 31 communicate with the multiple extraction pipes 210 in one-to-one correspondence to extract gas in the multiple subspaces 31, so that surface regions of the glass sheets 900 corresponding to the multiple subspaces 31 may be subjected to different vacuum extracting gas effect or gas blowing effect. In this way, the shapes of regions of the glass sheets 900 at various positions can be adjusted, so that the glass can meet corresponding structural requirements of bending.

In an embodiment, the device 1000 further includes a first gas-heating system (not illustrated). The first gas-heating system is mounted at the at least one blowing pipe 220 and configured to heat gas blown from the at least one blowing pipe 220 to the glass sheets 900 so that a temperature of the gas is adjustable. The first gas-heating system is configured to effectively regulate a temperature of gas blown from the blowing pipe 220, and in turn adjust a temperature of gas blown into in the subspace 31 communicating with the blowing pipe 220, so that the temperature of the glass at a position corresponding to the subspace 31 communicating with the blowing pipe 220 can be more precisely controlled, controlling and preventing a spherical surface of the glass sheets 900 from further falling at the position corresponding to the subspace 31 communicating with the blowing pipe 220, and satisfying the corresponding structural requirements of bending.

It is noted that, when a curvature of the spherical surface of the glass sheets 900 at a position corresponding to the subspace 31 communicating with the blowing pipe 220 is close to or equal to a desired curvature, gas blowing effect can prevent the spherical surface of the glass sheets 900 from further falling at the position corresponding to the subspace 31 communicating with the blowing pipe 220. By regulating a blowing gas temperature of the first gas-heating system communicating with the blowing pipe 220 on the concave solid lower mold 100, a temperature of the surface of the glass sheets 900 at a position corresponding to the subspace 31 communicating with the blowing pipe 220 can be precisely controlled. When the blowing gas temperature of the first gas-heating system is set to be lower than or equal to the temperature of the surface of the glass sheets 900, gas blowing effect may lower the temperature of the glass sheets 900 at the position corresponding to the subspace 31 communicating with the blowing pipe 220, thereby further preventing the spherical surface of the glass sheets 900 from further falling at the position corresponding to the subspace 31 communicating with the blowing pipe 220. This means that the closer the curvature of the spherical surface of the glass sheets 900 at the position corresponding to the subspace 31 communicating with the blowing pipe 220 is to the desired curvature, the lower the blowing gas temperature of the first gas-heating system is relative to the temperature of the surface of the glass sheets 900. As such, the temperature of the glass sheets 900 at the position corresponding to the subspace 31 communicating with the blowing pipe 220 can be lowered, better preventing the spherical surface of the glass sheets 900 from further falling at the position corresponding to the subspace 31 communicating with the blowing pipe.

Figure 5:
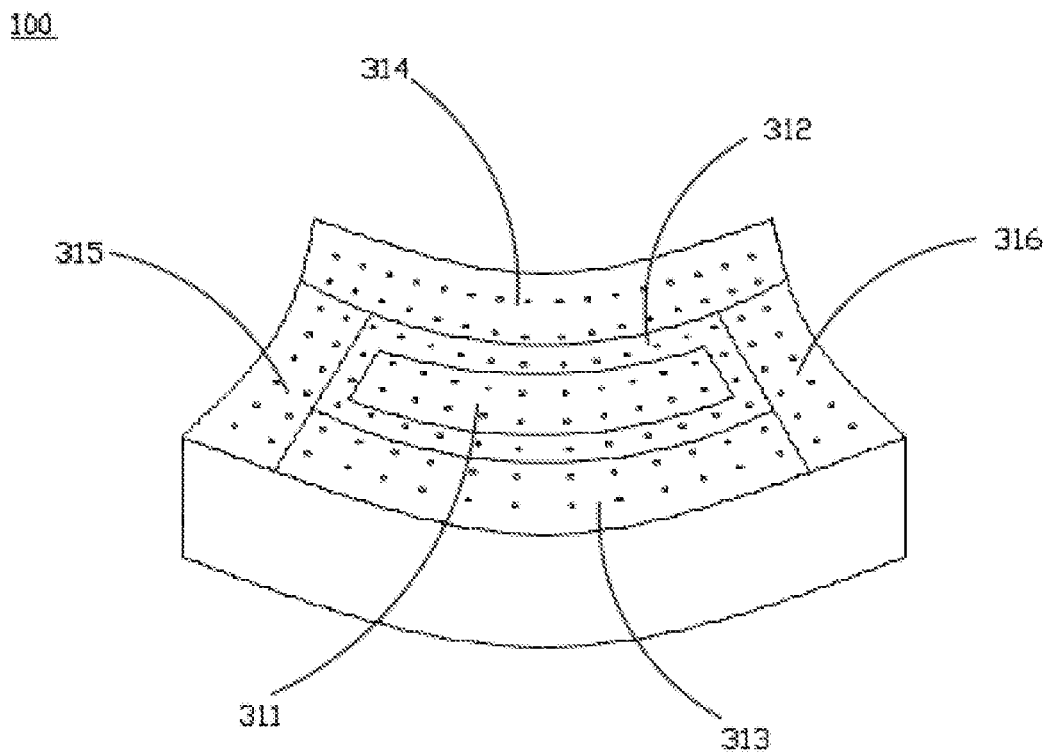
FIG. 5 is a schematic diagram illustrating region division of a concave solid lower mold according to an embodiment.
Figure 6:
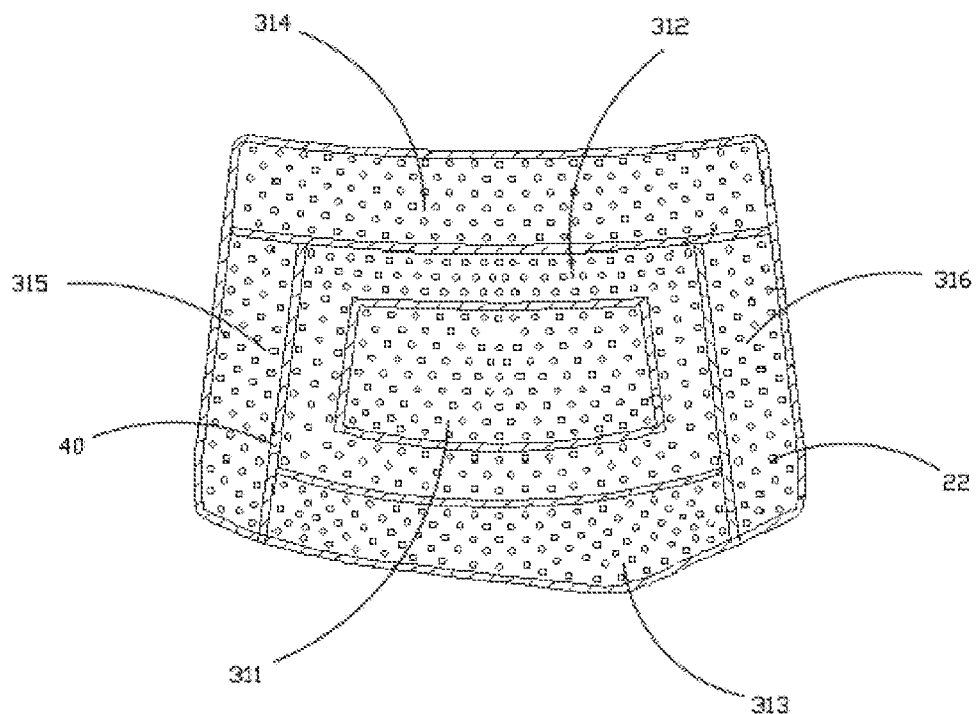
FIG. 6 is a top view of a concave solid lower mold according to an embodiment.

Refer to FIG. 5 and FIG. 6, FIG. 5 is a schematic diagram illustrating region division of the concave solid lower mold 100 according to an embodiment.

FIG. 6 is a top view of the concave solid lower mold 100 according to an embodiment.

In an embodiment, the multiple subspaces 31 include a central subspace 311, a buffer subspace 312, and multiple edge subspaces 31. The central subspace 311 corresponds to a middle region of the top plate 20, the buffer subspace 312 surrounds the central subspace 311, and the multiple edge subspaces 31 are distributed around the buffer subspace 312 and cooperatively surround the buffer subspace 312. In an embodiment, as illustrated in FIG. 3, the at least one blowing pipe 220 communicates with the buffer subspace 312, and the multiple extraction pipes 210 communicate with the central subspace 311 and the multiple edge subspaces 31. The multiple subspaces 31 in the device 1000 for bending vehicle glass are divided into the central subspace 311, the buffer subspace 312, and the multiple edge subspaces 31. The central subspace 311, the buffer subspace 312, and the multiple edge subspaces 31 respectively correspond to different regions of the glass sheets 900, the multiple extraction pipes 210 are configured for extracting gas in the central subspace 311 and the multiple edge subspace 31, and the at least one blowing pipe 220 is configured for blowing gas to the buffer subspace 312, so that a vacuum extracting gas effect of or gas blowing effect for each of the multiple subspaces 31 is adjustable, and thus vacuum adsorption forces on the glass sheets 900 at various positions can be changed. In this way, a shape of the glass sheets 900 can be adjusted, so that the glass can meet corresponding structural requirements of bending.

In another embodiment, the at least one blowing pipe 220 communicates with the central subspace 311, and the multiple extraction pipes 210 communicate with the buffer subspace 312 and the multiple edge subspaces 31 (as illustrated in FIG. 4). It is noted that, the blowing pipe 220 may communicate with the subspace 31 in but is not limited to the above two modes, and the blowing pipe 220 may also communicate with any other subspace 31 to meet different operation requirements, which will not be described herein.

It is noted that, the gas blowing effect can prevent a further falling of the region of the glass at a position corresponding to a subspace 31 communicating with the blowing pipe 220. As a falling of the region of the glass at a position corresponding to the central subspace 311 or the buffer subspace 312 is prevented by the gas blowing effect, the force distribution of the glass at positions corresponding to the other subspaces 31 is changed, making it easier to change the shape of the glass sheets 900 under the vacuum adsorption force generated by the extraction pipe 210, even under a relatively low vacuum adsorption force. The relatively low vacuum adsorption force can further avoid possible excessive extrusion between the carrying surface 21 and the glass sheets 900 at positions corresponding to the other subspaces 31, improving the molding surface quality and the optical quality of the glass sheets 900.

In an embodiment, the multiple edge subspaces 31 include a lower subspace 313, an upper subspace 314, a first side subspace 315, and a second side subspace 316. The lower subspace 313 and the upper subspace 314 are located at opposite sides of the buffer subspace 312, the first side subspace 315 and the second side subspace 316 are located at opposite sides of the buffer subspace 312. The top plate 20 has a first region corresponding to the lower subspace 313 and a second region corresponding to the upper subspace 314, where a radius of curvature of the first region is greater than a radius of curvature of the second region. The multiple edge subspaces 31 are divided into the lower subspace 313, the upper subspace 314, the first side subspace 315, and the second side subspace 316. The lower subspace 313, the upper subspace 314, the first side subspace 315, and the second side subspace 316 correspond to different regions of the edge of the glass sheets 900. Gas extracting is performed for the lower subspace 313, the upper subspace 314, the first side subspace 315, and the second side subspace 316 separately, so that different regions of the edge of the glass sheets 900 are subjected to corresponding vacuum adsorption forces, and the shape of the edge of the glass sheets 900 can be adjusted more precisely.

It is noted that, the central subspace 311, the buffer subspace 312, the lower subspace 313, the upper subspace 314, the first side subspace 315, and the second side subspace 316 correspond to the regions of the glass sheets 900 at different positions, respectively. The vacuum adsorption forces generated by extracting gas in the multiple subspaces 31 through the multiple extraction pipes 210 exert on the glass sheets 900 to adjust the shapes of the regions of the glass sheets 900 at different positions. It is noted that, the multiple subspaces 31 are divided according to regions with different shapes of the glass sheets 900 preformed. In an embodiment, a region of the glass sheets 900 with the greatest forming difficulty and the greatest difference between a preformed spherical curvature and the desired curvature corresponds to the central subspace 311, a region of the glass sheets 900 with the second greatest forming difficulty and the second largest difference between a preformed spherical curvature and the desired curvature corresponds to the lower subspace 313 and the upper subspace 314, a region of the glass sheets 900 with the third greatest forming difficulty and the third largest difference between a preformed spherical curvature and the desired curvature corresponds to the buffer subspace 312, and a region of the glass sheets 900 with the minimum greatest forming difficulty and the minimum difference between a preformed spherical curvature and the desired curvature corresponds to the first side subspace 315 and the second side subspace 316. In another embodiment, a region of the glass sheets 900 with the greatest forming difficulty and the greatest difference between a preformed spherical curvature and the desired curvature corresponds to the buffer subspace 312, a region of the glass sheets 900 with the second greatest forming difficulty and the second largest difference between a preformed spherical curvature and the desired curvature corresponds to the lower subspace 313 and the upper subspace 314, a region of the glass sheets 900 with the third greatest forming difficulty and the third largest difference between a preformed spherical curvature and the desired curvature corresponds to the central subspace 311, and a region of the glass sheets 900 with the minimum greatest forming difficulty and the minimum difference between a preformed spherical curvature and the desired curvature corresponds to the first side subspace 315 and the second side subspace 316.

Since differences between the desired shapes and the shapes of the regions of the preformed glass sheets 900 at positions corresponding to different subspaces 31 vary, it is necessary to adjust the extraction performance of each of the multiple extraction pipes 210 communicating with the multiple subspaces 31, so that the vacuum adsorption force in each subspace can be adjusted. As such, the regions of the glass sheets 900 at different positions may be subjected to different vacuum adsorption forces, and thus each of the shapes of the regions of the glass sheets 900 at different positions may be adjusted to be the same as the desired shape, that is, the glass sheets 900 satisfies the corresponding structural requirements of bending.

In an embodiment, the device 1000 further includes a control member (not illustrated). The control member is configured to adjust the multiple extraction pipes 210 and the at least one blowing pipe 220 so that a vacuum extracting gas effect of or gas blowing effect for each of the multiple subspaces 31 is adjustable. The control member enables the extraction performance of the extraction pipe 210 and the blowing performance of the blowing pipe 220 to be effectively regulated, so that the vacuum extracting gas effect of or gas blowing effect for each of the multiple subspaces 31 can be precisely adjusted, and thus the shape of the glass sheets 900 is changed under a corresponding vacuum adsorption force at the position corresponding to each of the multiple subspaces 31 to meet the corresponding structural requirements of bending.

Figure 7:
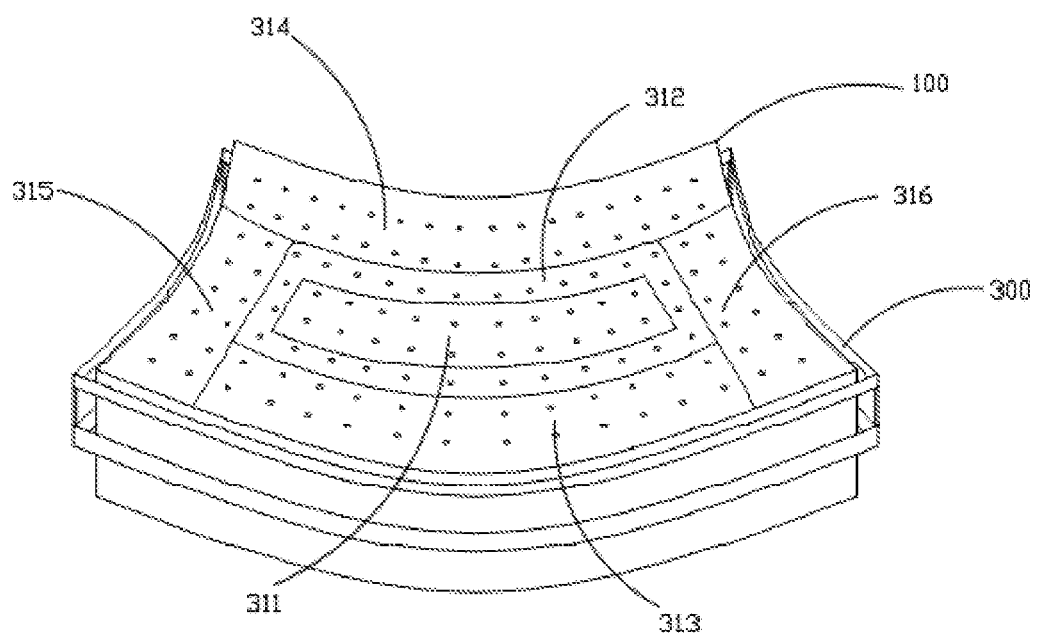
FIG. 7 is a schematic structural view illustrating a connection between a concave solid lower mold and a preformed frame according to an embodiment.

Refer to FIG. 7, FIG. 7 is a schematic structural view illustrating a connection between the concave solid lower mold and a preformed frame 300 according to an embodiment.

In an embodiment, the device 1000 further includes a preformed frame 300 in an annular shape. The preformed frame 300 may be sheathed on a periphery of the concave solid lower mold 100, and has a radius of curvature larger than a radius of curvature of the concave solid lower mold 100. The preformed frame 300 is used for preforming the glass sheets 900. The glass sheets 900 heated to a forming temperature is placed on the preformed frame 300, and the glass sheets 900 is preformed by gravity. Then, the preformed frame 300 is sheathed on the periphery of the concave solid lower mold 100 from the top down, and the glass sheets 900 is placed on the concave solid lower mold 100 for secondary molding. It is noted that, with the preformed frame 300, the preforming process and the secondary forming process can be carried out in succession, the forming temperature of the glass sheets 900 can be ensured, and the processing efficiency can also be improved.

Figure 8:
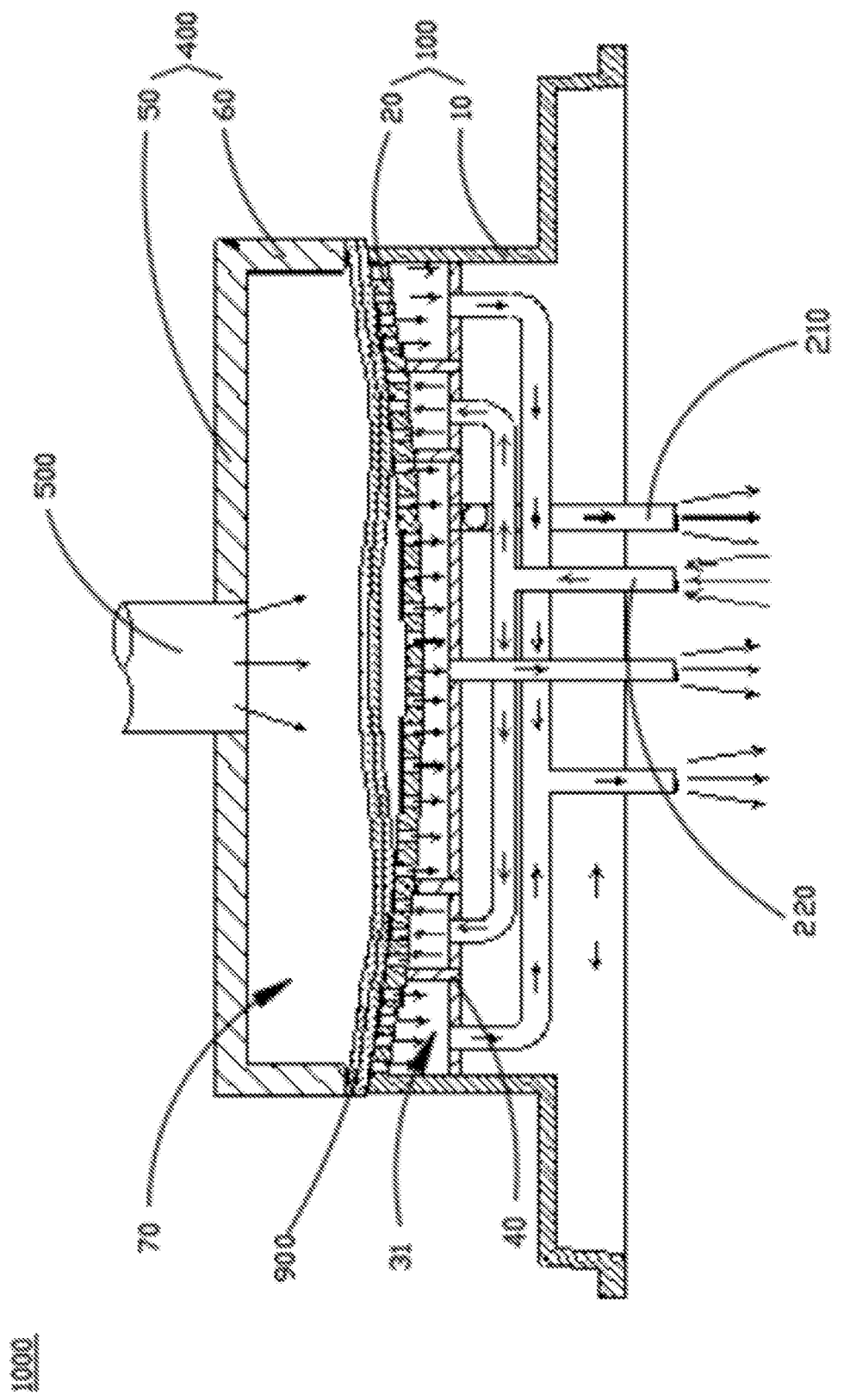
FIG. 8 is a schematic structural view of a device for bending vehicle glass according to another embodiment.
Figure 9:
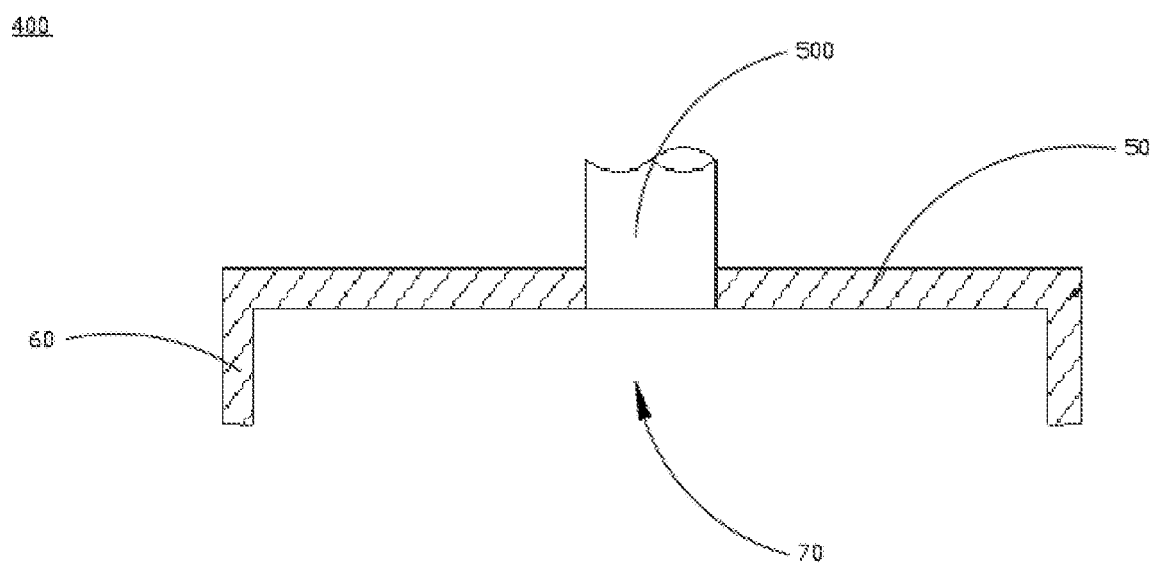
FIG. 9 is a schematic structural view of an annular upper mold according to an embodiment.
Figure 10:
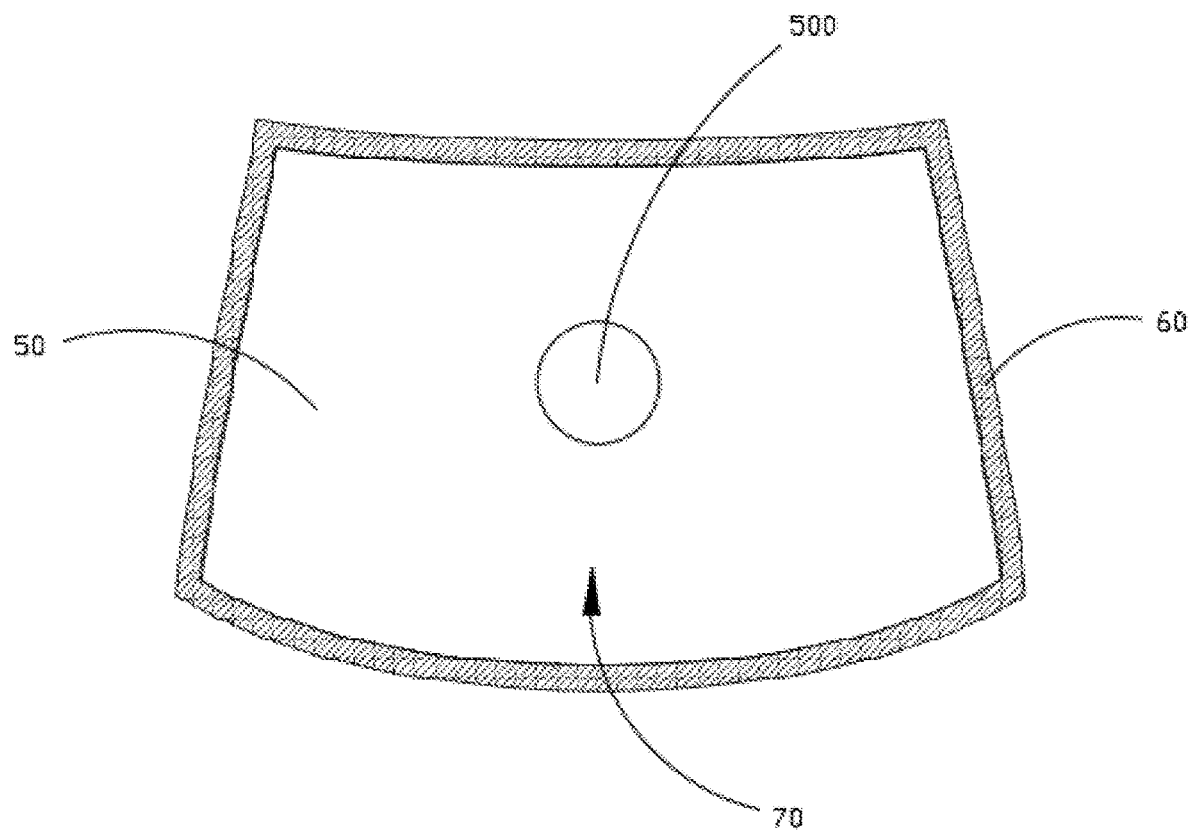
FIG. 10 is a top view of an annular upper mold according to an embodiment.

Refer to FIGS. 8-10, FIG. 8 is a schematic structural view of a device 1000 for bending vehicle glass according to another embodiment.

FIG. 9 is a schematic structural view of the annular upper mold 400 according to an embodiment.

FIG. 10 is a top view of the annular upper mold 400 according to an embodiment.

In an embodiment, the device 1000 further includes the annular upper mold 400. The annular upper mold 400 is disposed at a side of the top plate 20 away from the base 10 and includes an upper mold plate 50 and a side mold plate 60 that is disposed at a side of the upper mold plate 50 facing the carrying surface 21. The upper mold plate 50, the side mold plate 60, and an upper surface of the glass sheets 900 cooperatively define an accommodating cavity 70 when the annular upper mold 400 and the concave solid lower mold 100 move towards each other to make the side mold plate 60 in contact with the upper surface of the glass sheets 900, where the accommodating cavity 70 has a blowing channel 500, and the blowing channel 500 faces the carrying surface 21 and is configured for blowing gas to the glass sheets 900. The blowing channel 500 of the annular upper mold 400 is configured for blowing gas to the upper surface of the glass sheets 900, so that the upper surface of the glass sheets 900 is subjected to a blowing press force while the lower surface of the glass sheets 900 is subjected to a vacuum adsorption force, realizing a rapid bending of the glass sheets 900. Moreover, when the device 1000 for bending vehicle glass includes both the concave solid lower mold 100 and the annular upper mold 400, multiple glass sheets 900 stacked may be processed at the same time, which improves the processing efficiency to a certain extent.

There is a gap between the annular upper mold 400 and the concave solid lower mold 100, and the glass sheets 900 to be processed can be placed in the gap. A lower surface of the annular upper mold 400 has the same curvature as a desired curvature of an upper surface of a periphery of the glass sheets 900. With the above-mentioned structure, the annular upper mold 400 can be closely attached to the glass sheets 900, thereby avoiding gas leakage during the secondary molding process of the glass sheets 900 that is performed via the annular upper mold 400. In an embodiment, a region of the annular upper mold 400 where the annular upper mold 400 is in contact with the periphery of the glass sheets 900 has a width ranging from 0.5 cm to 25 cm. The annular upper mold 400 may be made of metal, ceramic, or any other material that meets the corresponding requirements, which is not limited herein.

In an embodiment, the device 1000 further includes a second gas-heating system (not illustrated). The second gas-heating system is mounted at the blowing channel 500 to heat gas blown from the blowing channel 500 to the glass sheets 900 so that a temperature of the gas is adjustable. The second gas-heating system is configured to effectively regulate a temperature of gas blown from the blowing channel 500 so that a bending temperature of the glass sheets 900 can be more precisely controlled, or to compensate heat loss in the above-mentioned gas-blowing process and gas-extracting process. At the same time, the bending temperature of the glass sheets 900 can be more precisely controlled, and the glass forming quality and the stress controllability after annealing can be further improved.

It is noted that, during a bending process of thin glass, the thin glass is more prone to decrease in temperature, increase in viscosity, and even harden of surface due to heat loss, thus it is more difficult to form a desired spherical surface under the same blow-molding conditions, resulting in an excessively large difference between a final bending curvature of the glass and the desired curvature. Here, by adjusting a temperature of the second gas-heating system communicating with the blowing channel 500 of the annular upper mold 400 to proximate to or even exceed a forming temperature of the glass sheets 900, the heat loss of the glass sheets 900 during the gas-blowing process and the gas-extracting process can be reduced, and even the glass sheets 900 can be heated, so that the glass sheets 900 is easier to achieve the desired spherical curvature.

Figure 11:
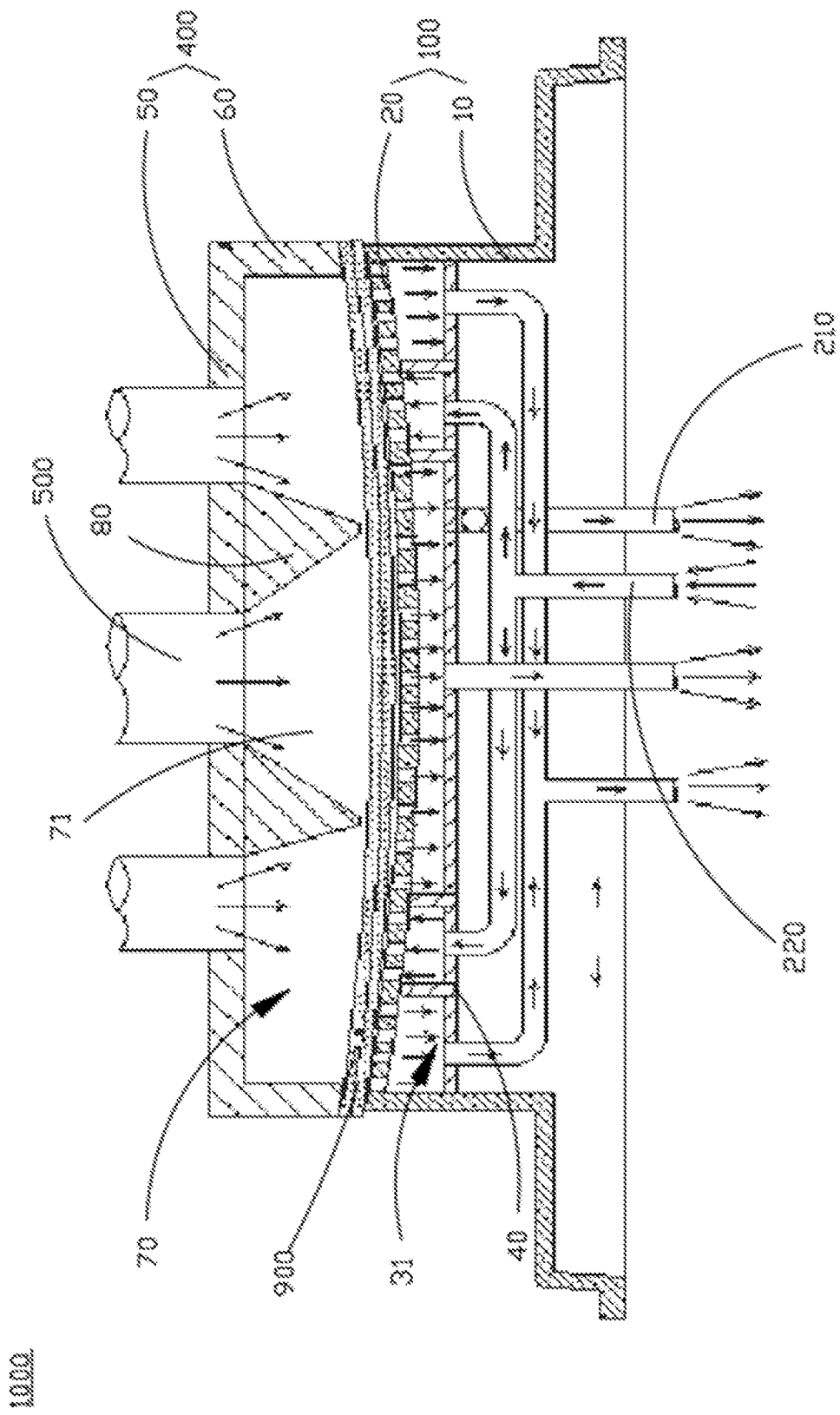
FIG. 11 is a schematic structural view of a device for bending vehicle glass according to another embodiment.
Figure 12:
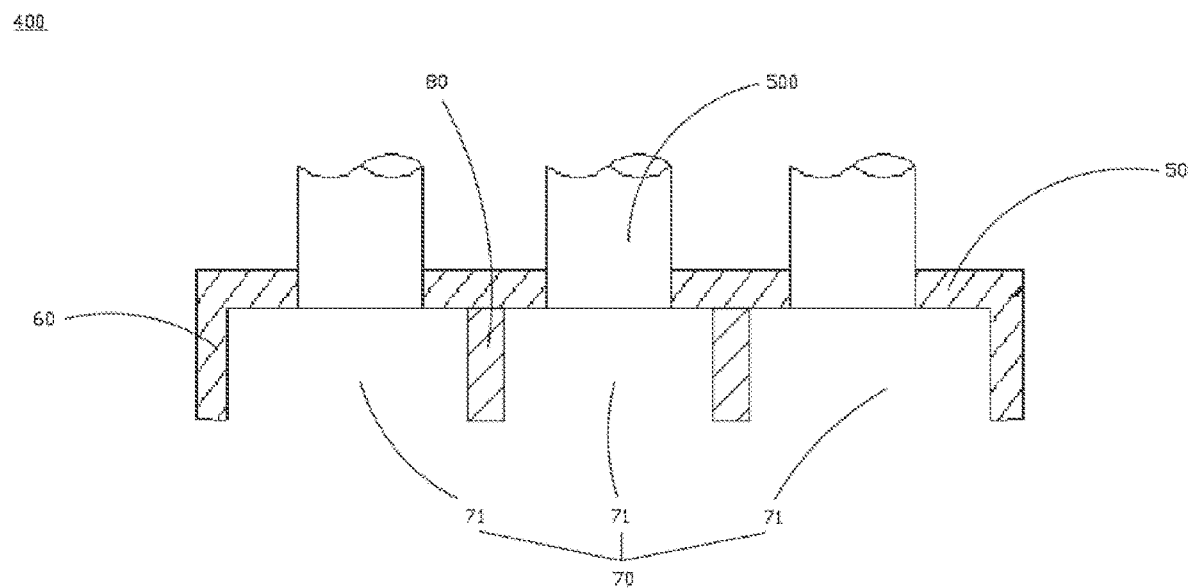
FIG. 12 is a schematic structural view of an annular upper mold according to another embodiment.
Figure 13:
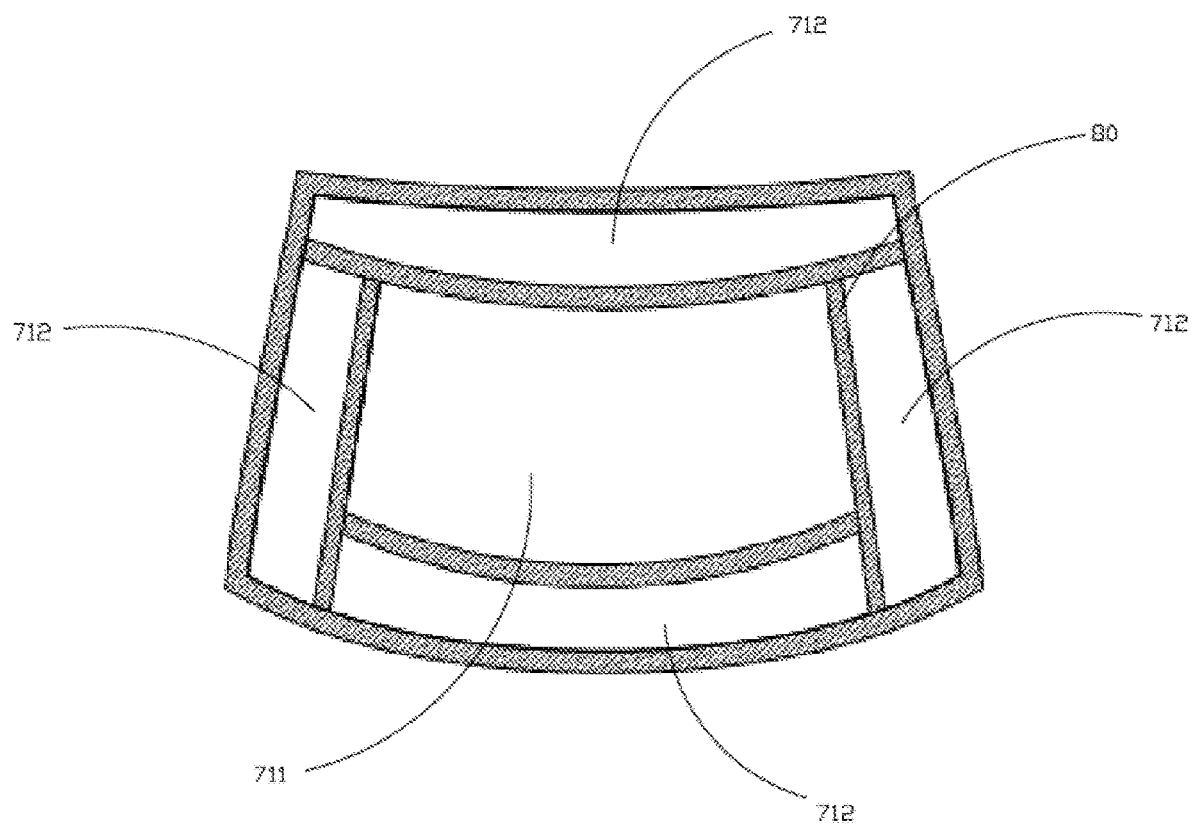
FIG. 13 is a schematic diagram illustrating distribution of accommodating sub-cavities of an annular upper mold according to another embodiment.

Refer to FIGS. 11-13, FIG. 11 is a schematic structural view of the device 1000 for bending vehicle glass according to another embodiment.

FIG. 12 is a schematic structural view of the annular upper mold 400 according to another embodiment.

FIG. 13 is a schematic diagram illustrating distribution of accommodating sub-cavities 71 of the annular upper mold 400 according to another embodiment.

In an embodiment, multiple second partitions 80 are arranged in the accommodating cavity 70 and divide the accommodating cavity 70 into multiple accommodating sub-cavities 71. The multiple accommodating sub-cavities 71 include a central accommodating sub-cavity 711 and multiple edge accommodating sub-cavities 712, the central accommodating sub-cavity 711 corresponds to the central subspace 311 and the buffer subspace 312, the multiple edge accommodating sub-cavities 712 correspond to the first side subspace 315, the second side subspace 316, the lower subspace 313, and the upper subspace 314 in one-to-one correspondence, and the accommodating cavity 70 has multiple blowing channels 500, where at least one of the multiple blowing channels 500 is disposed in each of the multiple accommodating sub-cavities 71. The multiple accommodating sub-cavities 71 are divided into the central accommodating sub-cavity 711 corresponding to a central region of the glass sheets 900 and the multiple edge accommodating sub-cavities 712 corresponding to edge regions of the glass sheets 900. The multiple blowing channels 500 are defined in the central accommodating sub-cavity 711 and the multiple edge accommodating sub-cavities 712 to blow gas to regions of the glass sheets 900 at corresponding positions, so that a blowing press force can be applied to a surface of the glass sheets 900, and a shape of the glass sheets 900 can be adjusted to meet corresponding structural requirements of bending. Moreover, the multiple accommodating sub-cavities 71 correspond to the multiple subspaces 31, so that each region of the glass sheets 900 can be subjected to a corresponding vacuum adsorption force and blowing press force, facilitating double adjustments of a forming shape of the glass sheets 900.

In an embodiment, there are multiple second gas-heating systems, and the multiple second gas-heating systems are mounted at the multiple blowing channels 500 respectively. By adjusting blowing gas temperatures of the multiple second gas-heating systems, regions of the glass sheets 900 at positions corresponding to the multiple accommodating sub-cavities are heated or cooled to different degrees, so that temperatures of the regions of the glass at positions corresponding to the multiple accommodating sub-cavities 71 can be more precisely controlled, the stress controllability of the glass sheets 900 after forming and annealing can be further improved, and the quality of the glass sheets 900 after forming can be improved, satisfying the corresponding structural requirements of bending.

In an embodiment, the blowing channel 500 has a blowing power, a blowing starting time, and a blowing duration that are all adjustable. By adjusting the blowing power, the blowing starting time, and the blowing duration of each blowing channel 500, a blowing press force generated by each accommodating sub-cavity 71 through the blowing channel 500 can be effectively regulated to adjust a shape of the glass sheets 900 at a position corresponding to each accommodating sub-cavity 71, so that the glass sheets 900 can meet corresponding structural requirements of bending.

Figure 14:
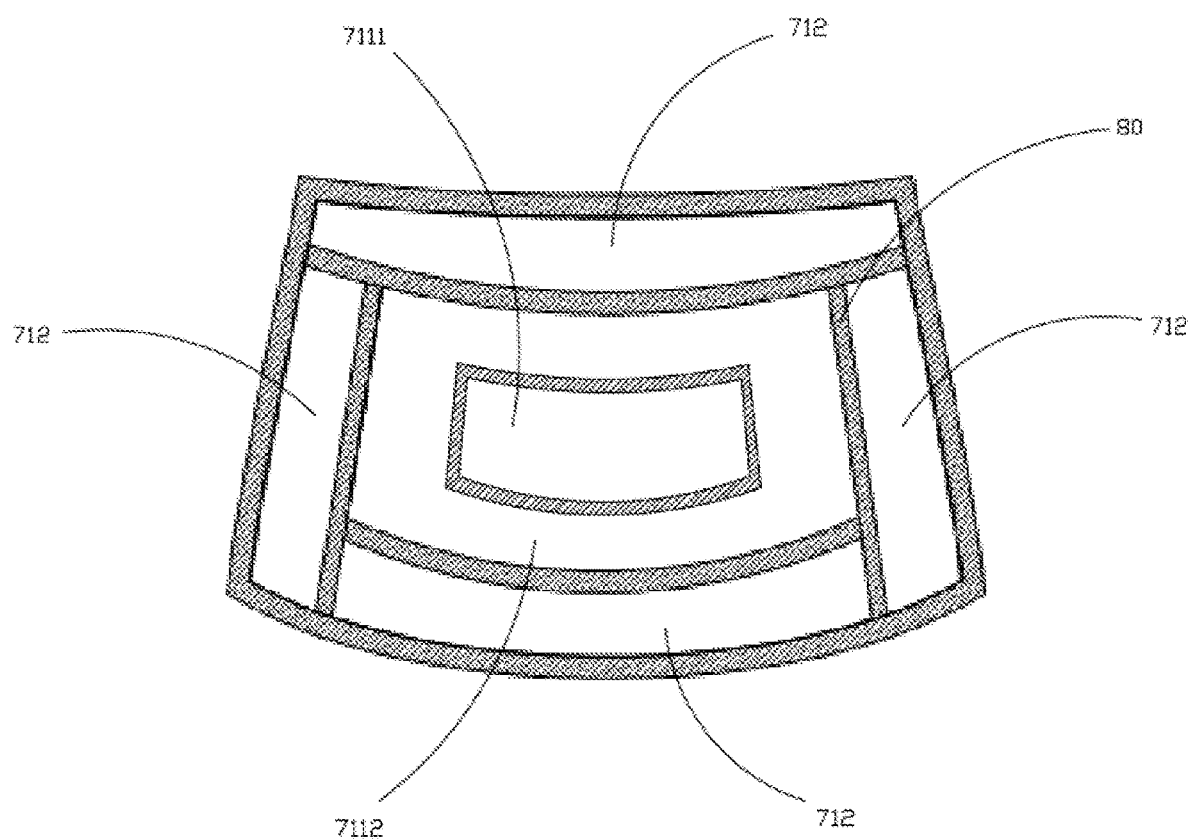
FIG. 14 is a schematic diagram illustrating distribution of accommodating sub-cavities of an annular upper mold according to another embodiment.

Refer to FIG. 14, FIG. 14 is a schematic diagram illustrating distribution of accommodating sub-cavities 71 of the annular upper mold 400 according to another embodiment.

In an embodiment, the central accommodating sub-cavity 711 includes a first central accommodating sub-cavity 7111 and a second central accommodating sub-cavity 7112. The first central accommodating sub-cavity 7111 corresponds to the central subspace 311, and the second central accommodating sub-cavity 7112 corresponds to the buffer subspace 312, and at least one of the multiple blowing channels 500 is disposed in each of the first central accommodating sub-cavity 7111 and the second central accommodating sub-cavity 7112. The central accommodating sub-cavity 711 is divided into the first central accommodating sub-cavity 7111 and the second central accommodating sub-cavity 7112. The first central accommodating sub-cavity 7111 corresponds to the central subspace 311 and the second central accommodating sub-cavity 7112 corresponds to the buffer subspace 312, so that a shape of the central region of the glass sheets 900 can be adjusted more precisely.

Figure 15:
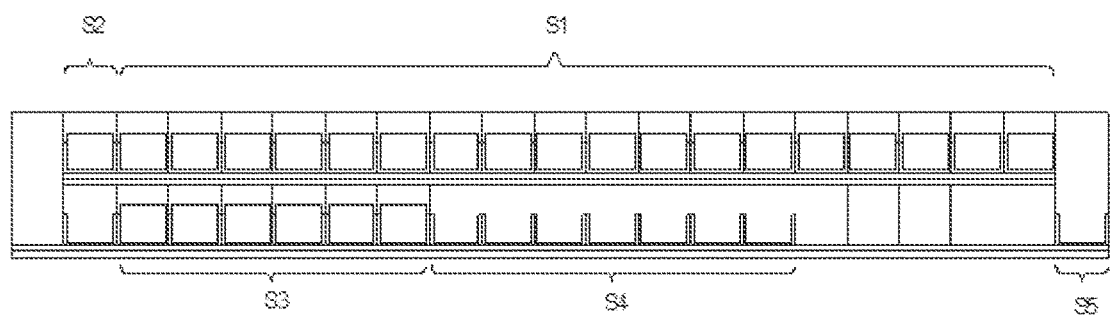
FIG. 15 is a schematic structural view of a traditional device for gravity bending vehicle glass.

Refer to FIG. 15 and FIG. 16, FIG. 15 is a schematic structural view of a traditional device for gravity bending vehicle glass. A typical gravity forming device includes a heating-preforming region S1, a heating-forming region S2, an annealing region S3, a cooling region S4, and a loading/unloading region S5. Heaters are positioned at the upper and/or bottom of the heating-preforming region S1 and the heating-forming region S2, and the glass is placed on a mold at the loading/unloading region S5. Then the mold and the glass on the mold are intermittently transported in the heating-preforming region S1, the heating-forming region S2, the annealing region S3, the cooling region S4, and the unloading region S5, realizing heating and gravity pre-bending, heating and gravity bending, annealing, and cooling of the glass. Finally, the glass is removed from the mold in the unloading region, and then another glass is placed on the mold to start the next round of self-weight molding.

FIG. 16 is a schematic flow chart of a method for bending vehicle glass according to an embodiment.

Different from the traditional device for gravity bending vehicle glass, in the embodiment of the disclosure, the device 1000 for bending vehicle glass operates after operations in the heating-forming region S2. That is, after the glass on the mold is subjected to heating and gravity pre-bending, heating and gravity bending through the heating-preforming region S1 and the heating-forming region S2, the glass subjected to gravity bending is transferred to the concave solid lower mold 100 of the device 1000 for bending vehicle glass provided in the embodiments of the disclosure, so that bending is further carried out for the glass according to processes illustrated in FIG. 16. After bending, the glass is further transferred to a gravity forming mold for annealing, cooling, and unloading. The device 1000 for bending vehicle glass provided in the embodiments of the disclosure is not limited to be installed in a double-deck device for gravity bending vehicle glass as illustrated in FIG. 15, but can also be installed in a single-deck device for gravity bending vehicle glass, where in the single-deck device for gravity bending vehicle glass, the heating-preforming region S1, the heating-forming region S2, the annealing region S3, the cooling region S4, and the loading/unloading region S5 are on the same plane.

A method for bending vehicle glass provided in the embodiments of the disclosure begins with operations at block A1.

At block A1, a device for bending vehicle glass is provided. The device includes a concave solid lower mold, multiple extraction pipes, and at least one blowing pipe. The concave solid lower mold includes a base and a top plate covered on the base. The base and the top plate cooperatively define an accommodating space. The top plate has a carrying surface that is away from the base and is an irregular concave shaping surface. The carrying surface is configured to carry at least one glass sheet. The top plate has multiple through holes. Multiple first partitions are arranged in the accommodating space to divide the accommodating space into multiple subspaces, each of the multiple subspaces communicates with at least one of the multiple through holes, each of the at least one blowing pipe communicates with at least one of the multiple subspaces, and the rest of the multiple subspaces communicates with the multiple extraction pipes in one-to-one correspondence.

At block A2, the at least one glass sheet heated to a forming temperature is placed on the carrying surface, the at least one glass sheet is deformed under gravity.

At block A3, gas is extracted from in the multiple the subspaces through the multiple extraction pipes and gas is blown into the at least one subspace through the at least one blowing pipe so that the at least one glass sheet can be completely attached to the carrying surface.

The at least one glass sheet is processed by the method for bending vehicle glass provided in the disclosure, which is beneficial to effectively adjust the shapes of regions of the at least one glass sheet at various positions, so that the at least one glass sheet meets the corresponding structural requirements of bending.

In an embodiment, the shapes of regions of the at least one glass sheet at various positions are adjusted, so that the regions of the at least one glass sheet at various positions are formed to be able to be attached to the carrying surface at the same time or almost at the same time, so that the at least one glass sheet can meet the corresponding structural requirements of bending. In this case, it means that not only a complex glass sheet with a high precision and large spherical surface can be obtained, but also any visible optical defects can be avoided.

In an embodiment, the multiple subspaces include a central subspace, a buffer subspace, and multiple edge subspaces. The central subspace corresponds to a middle region of the top plate, the buffer subspace surrounds the central subspace, and the multiple edge subspaces are distributed around the buffer subspace and cooperatively surround the buffer subspace. Multiple extraction pipes communicating with the central subspace, the buffer subspace, and the multiple edge subspaces have different extraction modes.

In an embodiment, the multiple subspaces include a central subspace, a buffer subspace, and multiple edge subspaces. The central subspace corresponds to a middle region of the top plate, the buffer subspace surrounds the central subspace, and the multiple edge subspaces are distributed around the buffer subspace and cooperatively surround the buffer subspace. The at least one blowing pipe communicates with the buffer subspace, and the multiple extraction pipes communicate with the central subspace and the multiple edge subspaces, and the multiple extraction pipes have different extraction modes.

In an embodiment, the multiple subspaces include a central subspace, a buffer subspace, and multiple edge subspaces. The central subspace corresponds to a middle region of the top plate, the buffer subspace surrounds the central subspace, and the multiple edge subspaces are distributed around the buffer subspace and cooperatively surround the buffer subspace. The at least one blowing pipe communicates with the central subspace, and the multiple extraction pipes communicate with the buffer subspace and the plurality of edge subspaces, and the multiple extraction pipes have different extraction modes.

By extracting gas in or blowing gas to the multiple subspaces in different modes, regions of the glass corresponding to different subspaces are subjected to different vacuum adsorption forces, thereby adjusting a deformation of each region of the glass, so that the glass meets the corresponding structural requirements of bending.

In an embodiment, the gas in the multiple subspaces is extracted through the multiple extraction pipes and the gas is blown into the at least one subspace through the at least one blowing pipe as follows, so that the vehicle glass can be completely attached to the carrying surface.

An extraction power, an extraction starting time, and an extraction duration of each of the multiple extraction pipes are adjusted to adjust a vacuum extracting gas effect in each of the multiple subspaces respectively.

A blowing temperature, a blowing power, a blowing starting time, and a blowing duration of the at least one blowing pipe are adjusted.

By regulating the extraction performance of each of the multiple extraction pipes and the blowing performance of the at least one blowing pipe, the vacuum extracting gas effect of or gas blowing effect for each of the multiple subspaces can be precisely adjusted, and thus the shape of the glass is changed under a corresponding vacuum adsorption force at the position corresponding to each of the multiple subspaces to meet the corresponding structural requirements of bending.

In an embodiment, the extraction power, the extraction starting time, and the extraction duration of each of the multiple extraction pipes are adjusted to adjust the vacuum extracting gas effect in each of the multiple subspaces respectively as follows.

An extraction power of an extraction pipe communicating with the central subspace or the buffer subspace is adjusted to be a first extraction power, an extraction power of an extraction pipe communicating with the lower subspace and the upper subspace is adjusted to be a second extraction power, and an extraction power of an extraction pipe communicating with the first side subspace and the second side subspace is adjusted to be a third extraction power, where the second extraction power is less than the first extraction power, and the third extraction power is less than the second extraction power. By adjusting the extraction power of the extraction pipe, a vacuum adsorption force exerted on the glass at a position corresponding to each subspace can be adjusted, so that the shape of the glass can be changed to meet the corresponding structural requirements of bending.

In an embodiment, the extraction power, the extraction starting time, and the extraction duration of each of the multiple extraction pipes are adjusted to adjust the vacuum extracting gas effect in each of the multiple subspaces respectively as follows.

An extraction starting time of an extraction pipe communicating with the central subspace or the buffer subspace is adjusted to be a first time, an extraction starting time of an extraction pipe communicating with the lower subspace and the upper subspace is adjusted to be a second time, and an extraction starting time of an extraction pipe communicating with the first side subspace and the second side subspace is adjusted to be a third time, where the second time is later than the first time and the third time is later than the second time. By adjusting the extraction starting time of the extraction pipe, a sequence of applying vacuum adsorption forces to regions of the glass corresponding to the multiple subspaces can be adjusted, so that the shape of the glass can be changed to meet the corresponding structural requirements of bending.

In an embodiment, the extraction power, the extraction starting time, and the extraction duration of each of the multiple extraction pipes are adjusted to adjust the vacuum extracting gas effect in each of the multiple subspaces respectively as follows.

An extraction duration of an extraction pipe communicating with the central subspace or the buffer subspace is adjusted to be a first duration, an extraction duration of an extraction pipe communicating with the lower subspace and the upper subspace is adjusted to be a second duration, and an extraction duration of an extraction pipe communicating with the first side subspace and the second side subspace is adjusted to be a third duration, where the second duration is shorter than the first duration and the third duration is later than the second duration. By adjusting the extraction duration of the extraction pipe, a duration of exertion of a vacuum adsorption force on the glass at a position corresponding to each of the multiple subspaces can be adjusted, so that the shape of the glass can be changed to meet the corresponding structural requirements of bending.

In an embodiment, the extraction power, the extraction starting time, and the extraction duration of each of the multiple extraction pipes are adjusted to adjust the vacuum extracting gas effect in each of the multiple subspaces respectively as follows.

An extraction power of an extraction pipe communicating with the lower subspace and the upper subspace is adjusted to be less than an extraction power of an extraction pipe communicating with the central subspace or the buffer subspace, and an extraction power of an extraction pipe communicating with the first side subspace and the second side subspace is adjusted to be less than the extraction power of the extraction pipe communicating with the lower subspace and the upper subspace.

An extraction starting time of the extraction pipe communicating with the lower subspace and the upper subspace is adjusted to be later than an extraction starting time of the extraction pipe communicating with the central subspace or the buffer subspace, and an extraction starting time of the extraction pipe communicating with the first side subspace and the second side subspace is adjusted to be later than the extraction starting time of the extraction pipe communicating with the lower subspace and the upper subspace.

An extraction duration of the extraction pipe communicating with the lower subspace and the upper subspace is adjusted to be shorter than an extraction duration of the extraction pipe communicating with the central subspace or the buffer subspace, and an extraction duration of the extraction pipe communicating with the first side subspace and the second side subspace is adjusted to be shorter than the extraction duration of the extraction pipe communicating with the lower subspace and the upper subspace.

The extraction power, the extraction starting time, and the extraction duration of the extraction pipe are adjusted at the same time, thereby more systematically adjusting a shape of each region of the glass, so that the glass can meet the corresponding structural requirements of bend molding.

In an embodiment, the extraction power, the extraction starting time, and the extraction duration of each of the multiple extraction pipes are adjusted to adjust the vacuum extracting gas effect in each of the multiple subspaces respectively as follows.

An extraction pipe communicating with at least one of the central subspace, the buffer subspace, the lower subspace, the upper subspace, the first side subspace, or the second side subspace is closed, when the vehicle glass is attached to or proximately attached to the carrying surface at a position corresponding to the at least one of the central subspace, the buffer subspace, the lower subspace, the upper subspace, the first side subspace, or the second side subspace. When the surface of the glass is attached to or proximately attached to the carrying surface at a position corresponding to one subspace, an extraction pipe communicating with the one subspace may be closed, and the shape of the glass may be indirectly adjusted by extracting gas through extraction pipes communicating with subspaces adjacent to the one subspace, avoiding excessive extrusion between the glass and the carrying surface caused by continuous extracting gas.

It is noted that, the extraction power, the extraction starting time, and the extraction duration of each extraction pipe can be adjusted in but is not limited to the above modes, and other adjustment modes can be adopted according to the actual situation as long as it can make the glass satisfy the corresponding structural requirements of bending, which is not limited herein.

In an embodiment, the blowing temperature, the blowing power, the blowing starting time, and the blowing duration of the at least one blowing pipe are adjusted as follows.

The at least one blowing pipe starts blowing when the vehicle glass is attached to or proximately attached to the carrying surface at a position corresponding to at least one of the central subspace, the lower subspace, the upper subspace, the buffer subspace, the first side subspace, or the second side subspace, where the blowing power of the at least one blowing pipe is less than or equal to the extraction power of each of the multiple extraction pipes, and/or the blowing duration of the at least one blowing pipe is less than or equal to the extraction duration of each of the multiple extraction pipes. When the surface of the glass is attached to or proximately attached to the carrying surface at a position corresponding to at least one subspace, in order to avoid optical defects caused by extrusion between the surface of the glass and the carrying surface (where the extrusion is caused by gas extracting through the extraction pipe), gas blowing through the blowing pipe can be performed to lower the vacuum extracting gas effect and in turn prevent excessive extrusion between the surface of the glass and the carrying surface.

It is noted that, the gas blowing can prevent a further falling of the spherical surface of the glass at a position corresponding to a subspace communicating with the blowing pipe. As a falling of the spherical surface of the glass at a position corresponding to the central subspace is prevented by the gas blowing, the force distribution of the glass at positions corresponding to the other subspaces (which include the buffer subspace and the multiple edge subspaces) is changed, making it easier to change the shape of the glass under the vacuum adsorption force generated by the extraction pipe, even under a relatively low vacuum adsorption force. The relatively low vacuum adsorption force can further avoid possible excessive extrusion between the carrying surface and the glass at positions corresponding to the other subspaces (which include the buffer subspace and the multiple edge subspaces), improving the molding surface quality and the optical quality of the glass.

In an embodiment, the blowing temperature, the blowing power, the blowing starting time, and the blowing duration of the at least one blowing pipe are adjusted as follows.

When a curvature of the spherical surface of the glass at a position corresponding to the subspace communicating with the blowing pipe is proximate to or equal to a desired curvature, gas blowing can prevent the spherical surface of the glass from further falling at the position corresponding to the subspace communicating with the blowing pipe. By regulating a blowing gas temperature of a gas-heating system communicating with the blowing pipe on the concave solid lower mold, a temperature of the surface of the glass at a position corresponding to the subspace communicating with the blowing pipe can be precisely controlled. When the blowing gas temperature of the gas-heating system is set to be lower than or equal to the temperature of the surface of the glass, gas blowing may lower the temperature of the glass at the position corresponding to the subspace communicating with the blowing pipe, thereby further preventing the spherical surface of the glass from further falling at the position corresponding to the subspace communicating with the blowing pipe. This means that the closer the curvature of the spherical surface of the glass at the position corresponding to the subspace communicating with the blowing pipe is to the desired curvature, the lower the blowing gas temperature of the gas-heating system is relative to the temperature of the surface of the glass. As such, the temperature of the glass at the position corresponding to the subspace communicating with the blowing pipe can be lowered, better preventing the spherical surface of the glass from further falling at the position corresponding to the subspace communicating with the blowing pipe.

In an embodiment, the device further includes an annular upper mold. The annular upper mold is disposed at a side of the top plate away from the base and includes an upper mold plate and a side mold plate that is disposed at a side of the upper mold plate facing the carrying surface. The upper mold plate, the side mold plate, and an upper surface of the vehicle glass cooperatively define an accommodating cavity when the annular upper mold and the concave solid lower mold move towards each other to make the side mold plate in contact with the upper surface of the vehicle glass, where the accommodating cavity has a blowing channel, and the blowing channel faces the carrying surface and is configured for blowing gas to the vehicle glass. Gas is blown to the upper surface of the glass through the blowing channel of the annular upper mold, so that the upper surface of the glass is subjected to a blowing press force while the lower surface of the glass is subjected to a vacuum adsorption force, realizing a rapid bending of the glass. Moreover, when the device includes both the concave solid lower mold and the annular upper mold, multiple glasses stacked may be processed at the same time, which improves the processing efficiency to a certain extent.

In an embodiment, multiple second partitions are arranged in the accommodating cavity and divide the accommodating cavity into multiple accommodating sub-cavities, where the multiple accommodating sub-cavities correspond to the multiple subspaces respectively. The accommodating cavity has multiple blowing channels, where at least one of the multiple blowing channels is disposed in each of the multiple accommodating sub-cavities. The method includes the following. A blowing power, a blowing starting time, and a blowing duration of each of the plurality of blowing channels are adjusted, so that the vehicle glass is subjected to different blowing pressures at different positions opposite the plurality of accommodating sub-cavities. The multiple accommodating sub-cavities correspond to the multiple subspaces, so that each region of the glass can be subjected to a corresponding vacuum adsorption force and blowing press force, facilitating double adjustments of a forming shape of the glass.

The above embodiments are only preferred embodiments of the disclosure and cannot be understood as limitations on the disclosure. Those of ordinary skill in the art can understand that all or part of methods for realizing the above embodiments, and equivalent changes made in accordance with the claims of the disclosure, still fall within the scope covered by the disclosure.

What is claimed is:

1. A device for bending vehicle glass, comprising a concave solid lower mold, at least one blowing pipe, and a plurality of extraction pipes, wherein the concave solid lower mold comprises a base and a top plate covered on the base, the base and the top plate cooperatively define an accommodating space, and a plurality of first partitions are arranged in the accommodating space to divide the accommodating space into a plurality of subspaces, the top plate has a carrying surface that is concave and away from the base, and the top plate has a plurality of through holes that are in communication with the accommodating space and arranged at intervals, each of the plurality of subspaces corresponds to at least one of the plurality of through holes, each of the at least one blowing pipe communicates with at least one of the plurality of subspaces and is configured for blowing gas to the at least one of the plurality of subspaces, and the plurality of extraction pipes communicate with the rest of the plurality of subspaces in one-to-one correspondence for extracting gas in the rest of the plurality of subspaces;

when the plurality of subspaces comprise a central subspaces, a buffer subspace, and a plurality of edge subspaces, wherein the central subspace corresponds to a middle region of the top plate, the buffer subspace surrounds the central subspace, and the plurality of edge subspaces are distributed around the buffer subspace and cooperatively surround the buffer subspace, and the at least one blowing pipe communicates with the buffer subspace or the central subspace, and the plurality of extraction pipes communicate with the other subspaces; and wherein the plurality of edge subspaces comprise a lower subspace, an upper subspace, a first side subspace, and a second side subspace, the lower subspace and the upper subspace are located at opposite sides of the buffer subspace, the first side subspace and the second side subspace are located at opposite sides of the buffer subspace, and the top plate has a first region corresponding to the lower subspace and a second region corresponding to the upper subspace, wherein a radius of curvature of the first region is greater than a radius of curvature of the second region.

2. The device of claim 1, further comprising a first gas-heating system, wherein the first gas-heating system is mounted at the at least one blowing pipe and configured to heat gas blown from the at least one blowing pipe to the vehicle glass so that a temperature of the gas is adjustable.

3. The device of claim 1, further comprising an annular upper mold, wherein the annular upper mold is disposed at a side of the top plate away from the base and comprises an upper mold plate and a side mold plate that is disposed at a side of the upper mold plate facing the carrying surface, and the upper mold plate, the side mold plate, and an upper surface of the vehicle glass cooperatively define an accommodating cavity when the annular upper mold and the concave solid lower mold move towards each other to make the side mold plate in contact with the upper surface of the vehicle glass, wherein the accommodating cavity has a blowing channel, and the blowing channel faces the carrying surface and is configured for blowing gas to the vehicle glass.

4. The device of claim 3, wherein a plurality of second partitions are arranged in the accommodating cavity and divide the accommodating cavity into a plurality of accommodating sub-cavities, wherein the plurality of accommodating sub-cavities comprise a central accommodating sub-cavity and a plurality of edge accommodating sub-cavities, the central accommodating sub-cavity corresponds to the central subspace and the buffer subspace, the plurality of edge accommodating sub-cavities correspond to the first side subspace, the second side subspace, the lower subspace, and the upper subspace in one-to-one correspondence, and the accommodating cavity has a plurality of blowing channels, wherein at least one of the plurality of blowing channels is disposed in each of the plurality of accommodating sub-cavities.

5. The device of claim 4, wherein the central accommodating sub-cavity comprises a first central accommodating sub-cavity and a second central accommodating sub-cavity, wherein the first central accommodating sub-cavity corresponds to the central subspace, and the second central accommodating sub-cavity corresponds to the buffer subspace, and at least one of the plurality of blowing channels is disposed in each of the first central accommodating sub-cavity and the second central accommodating sub-cavity.

6. The device of claim 3, wherein the blowing channel has a blowing power, a blowing starting time, and a blowing duration that are all adjustable.

7. The device of claim 3, further comprising a second gas-heating system, wherein the second gas-heating system is mounted at the blowing channel to heat gas blown from the blowing channel to the vehicle glass so that a temperature of the gas is adjustable.

8. The device of claim 1, further comprising a preformed frame in an annular shape, wherein the preformed frame is sheathed on a periphery of the concave solid lower mold, and has a radius of curvature larger than a radius of curvature of the concave solid lower mold.

9. The device of claim 1, comprising one glass sheet or a plurality of glass sheets that are stacked on the carrying surface.

* * * * *